United States Patent [19]

Meyers

[11] Patent Number: 5,711,536
[45] Date of Patent: *Jan. 27, 1998

[54] SEAL COMPONENT FOR USE IN ON-SITE POURED CONCRETE OR PLASTIC TANK OR BOX COMPONENTS OF FLUID DISTRIBUTION SYSTEMS

[75] Inventor: Theodore W. Meyers, Berrington, Ill.

[73] Assignee: Tuf-Tite, Inc., Wauconda, Ill.

[*] Notice: The term of this patent shall not extend beyond the expiration date of Pat. No. 5,624,123.

[21] Appl. No.: 712,160

[22] Filed: Sep. 11, 1996

Related U.S. Application Data

[63] Continuation-in-part of Ser. No. 241,019, May 11, 1994, Pat. No. 5,624,123.

[51] Int. Cl.$^6$ ....................................... F16J 15/10
[52] U.S. Cl. .................... 277/207 A; 277/152; 277/193; 277/DIG. 10; 285/4
[58] Field of Search ............... 277/207 A, DIG. 10, 277/152, 193, 198, 212 R, 212 C, 212 F, 212 FB; 285/4, 178; 220/270, 285; 52/20, 21, 98, 99, 100; 210/170, 532.2

[56] References Cited

U.S. PATENT DOCUMENTS

| 1,258,884 | 3/1918 | Fife . |
| 1,278,120 | 9/1918 | Donnelly . |
| 1,592,454 | 7/1926 | Fredrickson . |

(List continued on next page.)

FOREIGN PATENT DOCUMENTS

| 269007 | 3/1969 | Austria . |
| 275421 | 11/1927 | Canada . |
| 959882 | 12/1974 | Canada . |

(List continued on next page.)

OTHER PUBLICATIONS

United Concrete Products, Inc. (Yalesville, Connecticut) brochure.

(List continued on next page.)

*Primary Examiner*—William A. Cuchlinski, Jr.
*Assistant Examiner*—John L. Beres
*Attorney, Agent, or Firm*—Tilton, Fallon, Lungmus & Chestnut

[57] ABSTRACT

An improved multi-function seal component for use in the walls of poured concrete or plastic tank or box components of fluid distribution systems is disclosed. The seal component includes a cylindrical wall member, an angled frustroconical wiper blade which is connected to a front end of the cylindrical wall member, and a backplate component which is connected to the back end of the cylindrical wall member. The backplate component may be integrally molded with the cylindrical wall member or may be formed as a separate component which attaches to the cylindrical wall member during assembly. When the backplate is molded as a separate component, it includes a U-shaped groove for attaching to the cylindrical wall member and includes a locking mechanism for releasably securing the backplate to the cylindrical wall member. The backplate also includes a sealing membrane which may include a plurality of removable portions each including an annular score line and one of more of the removable portions may further include a pull tab. The removable portions may be selectively removed to accommodate the insertion of different size pipes through the sealing membrane. When used in a poured concrete tank or box, a leveling device may be disposed in one of the openings formed by removing a portion of the sealing membrane for adjusting fluid flow out of the tank or box. When used in a plastic distribution or drop box, the backplate itself can have one of the openings removed so that the backplate itself can be used as a leveling device. The remaining portion of the sealing membrane deforms slightly inwardly around the leveling device, or outwardly around a pipe, to form, in effect, a secondary wiper blade to seal the connection to the backplate.

42 Claims, 10 Drawing Sheets

U.S. PATENT DOCUMENTS

| | | | |
|---|---|---|---|
| 1,898,087 | 2/1933 | Fullman . | |
| 1,926,197 | 9/1933 | Durr . | |
| 2,202,147 | 5/1940 | Gerriets . | |
| 2,244,280 | 6/1941 | Aghnides . | |
| 2,252,240 | 8/1941 | Tschappat . | |
| 2,897,533 | 8/1959 | Bull et al. . | |
| 3,048,911 | 8/1962 | Almon . | |
| 3,123,939 | 3/1964 | Erikson . | |
| 3,221,881 | 12/1965 | Weiler et al. . | |
| 3,276,176 | 10/1966 | Jonsson et al. . | |
| 3,363,799 | 1/1968 | Zurcher et al. . | |
| 3,385,012 | 5/1968 | Lovegreen . | |
| 3,408,091 | 10/1968 | Zylstra . | |
| 3,467,271 | 9/1969 | Kaiser et al. . | |
| 3,516,679 | 6/1970 | Schmitt | 277/51 |
| 3,521,414 | 7/1970 | Malissa . | |
| 3,602,530 | 8/1971 | Elwart . | |
| 3,654,965 | 4/1972 | Gramain . | |
| 3,724,273 | 4/1973 | Awrey | 73/389 |
| 3,731,448 | 5/1973 | Leo . | |
| 3,731,952 | 5/1973 | Elwart . | |
| 3,744,806 | 7/1973 | Keyser | 277/152 |
| 3,759,285 | 9/1973 | Yoakum . | |
| 3,787,061 | 1/1974 | Yoakum . | |
| 3,796,406 | 3/1974 | Ditcher | 249/11 |
| 3,800,486 | 4/1974 | Marvey . | |
| 3,802,466 | 4/1974 | Panella . | |
| 3,813,107 | 5/1974 | Ditcher | 277/189 |
| 3,832,438 | 8/1974 | Ditcher | 264/274 |
| 3,848,074 | 11/1974 | Channell . | |
| 3,857,589 | 12/1974 | Oostenbrink | 285/110 |
| 3,943,971 | 3/1976 | Schmunk . | |
| 3,973,783 | 8/1976 | Skinner et al. . | |
| 3,982,777 | 9/1976 | Martin | 285/192 |
| 4,007,941 | 2/1977 | Stancati | 277/178 |
| 4,020,868 | 5/1977 | Schmunk | 137/610 |
| 4,022,496 | 5/1977 | Crissy et al. . | |
| 4,073,048 | 2/1978 | Ditcher | 29/450 |
| 4,079,193 | 3/1978 | Channell . | |
| 4,097,380 | 6/1978 | Carlson . | |
| 4,103,901 | 8/1978 | Ditcher | 277/9.5 |
| 4,128,107 | 12/1978 | Blumhardt . | |
| 4,139,005 | 2/1979 | Dickey . | |
| 4,140,337 | 2/1979 | Arcella et al. . | |
| 4,159,829 | 7/1979 | Ditcher | 277/189 |
| 4,215,868 | 8/1980 | Skinner et al. | 277/1 |
| 4,230,157 | 10/1980 | Larsen et al. | 138/155 |
| 4,298,470 | 11/1981 | Stallings . | |
| 4,318,547 | 3/1982 | Ericson . | |
| 4,333,662 | 6/1982 | Jones . | |
| 4,342,462 | 8/1982 | Carlesimo | 277/207 A |
| 4,345,998 | 8/1982 | Graffis et al. . | |
| 4,346,921 | 8/1982 | Gill et al. | 285/110 |
| 4,350,351 | 9/1982 | Martin | 277/207 |
| 4,387,900 | 6/1983 | Ditcher et al. | 277/101 |
| 4,406,484 | 9/1983 | Ramer | 285/178 |
| 4,421,322 | 12/1983 | Ruch et al. . | |
| 4,426,095 | 1/1984 | Buttner . | |
| 4,440,406 | 4/1984 | Ericson . | |
| 4,478,437 | 10/1984 | Skinner | 285/189 |
| 4,488,388 | 12/1984 | Schmidt | 52/221 |
| 4,508,355 | 4/1985 | Ditcher | 277/189 |
| 4,543,069 | 9/1985 | Kobayashi | 277/207 A |
| 4,563,847 | 1/1986 | Hasty . | |
| 4,566,704 | 1/1986 | Van Dongeren . | |
| 4,602,504 | 7/1986 | Barber . | |
| 4,623,170 | 11/1986 | Cornwall | 285/4 |
| 4,625,976 | 12/1986 | Gilbert | 277/12 |
| 4,625,998 | 12/1986 | Draudt et al. . | |
| 4,627,647 | 12/1986 | Hauff | 285/189 |
| 4,645,177 | 2/1987 | Moakes | 285/178 |
| 4,663,036 | 5/1987 | Stobl, Jr. et al. | 210/170 |
| 4,732,397 | 3/1988 | Gavin | 277/207 |
| 4,744,571 | 5/1988 | Geberth, Jr. | 277/208 |
| 4,756,827 | 7/1988 | Mayer | 210/170 |
| 4,805,920 | 2/1989 | Gavin | 277/207 |
| 4,809,994 | 3/1989 | Skinner et al. | 277/207 |
| 4,846,506 | 7/1989 | Bocson et al. . | |
| 4,951,914 | 8/1990 | Meyers et al. | 249/11 |
| 5,000,491 | 3/1991 | Bartholomew . | |
| 5,036,636 | 8/1991 | Hasty . | |
| 5,043,536 | 8/1991 | De Bartolo, Jr. . | |
| 5,286,040 | 2/1994 | Gavin | 277/207 |
| 5,335,945 | 8/1994 | Meyers | 285/236 |
| 5,361,799 | 11/1994 | Chilton et al. | 137/363 |
| 5,507,501 | 4/1996 | Palmer | 277/DIG. 10 |

FOREIGN PATENT DOCUMENTS

| | | |
|---|---|---|
| 964043 | 3/1975 | Canada . |
| 1278588 | 1/1991 | Canada . |
| 684106 | of 1930 | France . |
| 2130492 | 2/1972 | Germany . |
| 142578 | 7/1980 | Germany . |
| 3136315 | 3/1983 | Germany . |
| 775309 | 5/1957 | United Kingdom . |
| 988663 | 4/1965 | United Kingdom . |
| 1211238 | 11/1970 | United Kingdom . |

OTHER PUBLICATIONS

Tuf–Tite, Inc. brochures.

Christy Concrete Products, Inc., Emeryville, California, 1967 p. 311.

Bowco Industries Inc., Duct Terminators and Couplings, (undated), whole document.

Pennsylvania Insert Corporation, Catalog etc., 1979—sixth page of catalog shows "Terminators" locked in concrete.

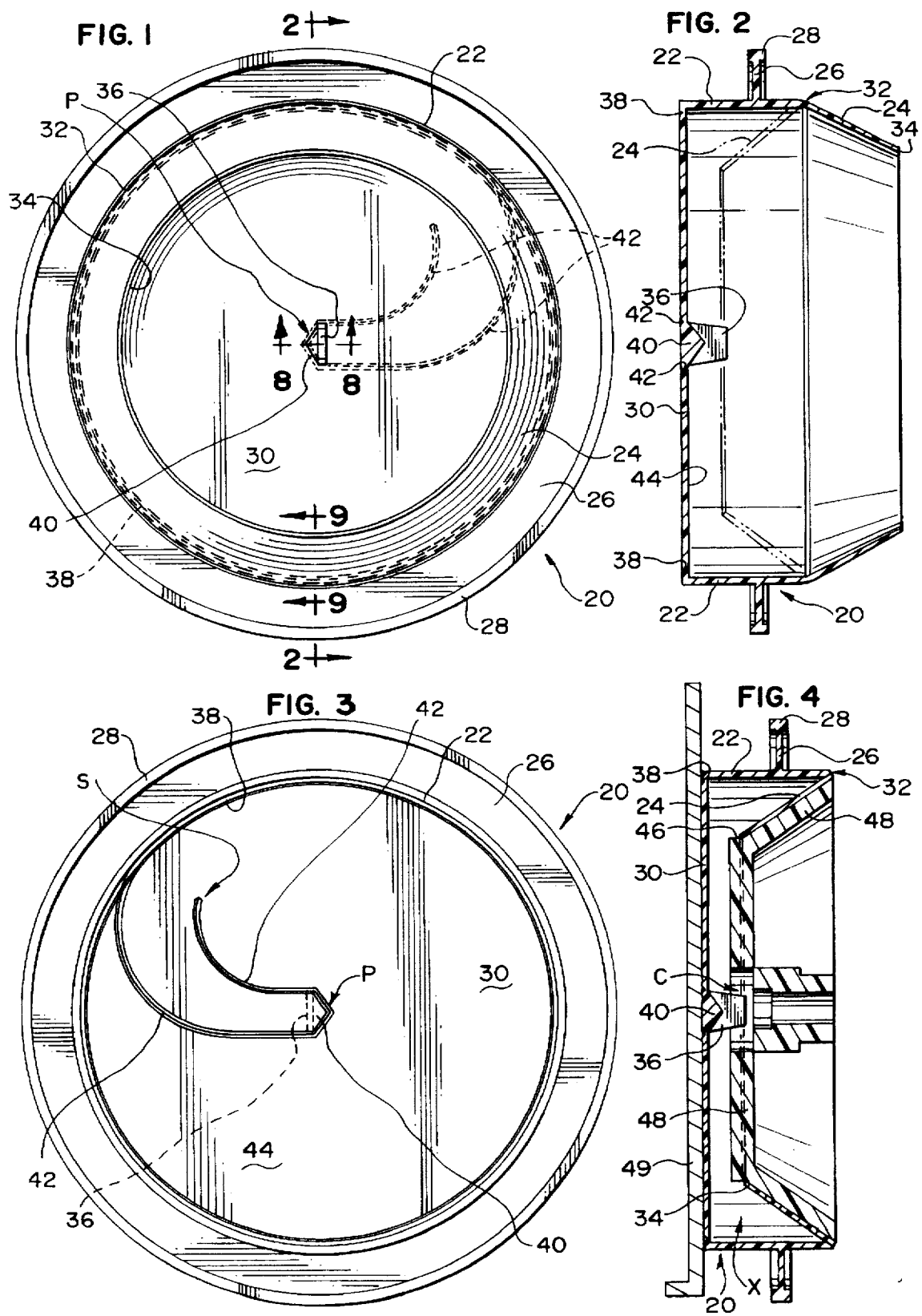

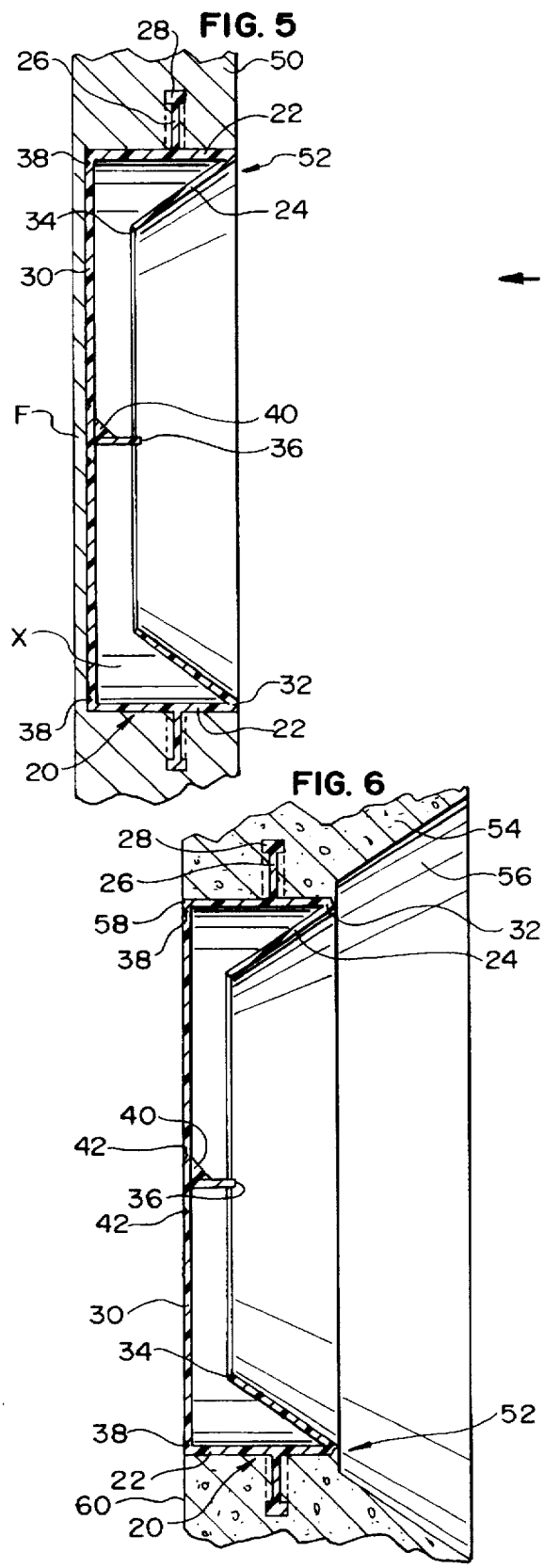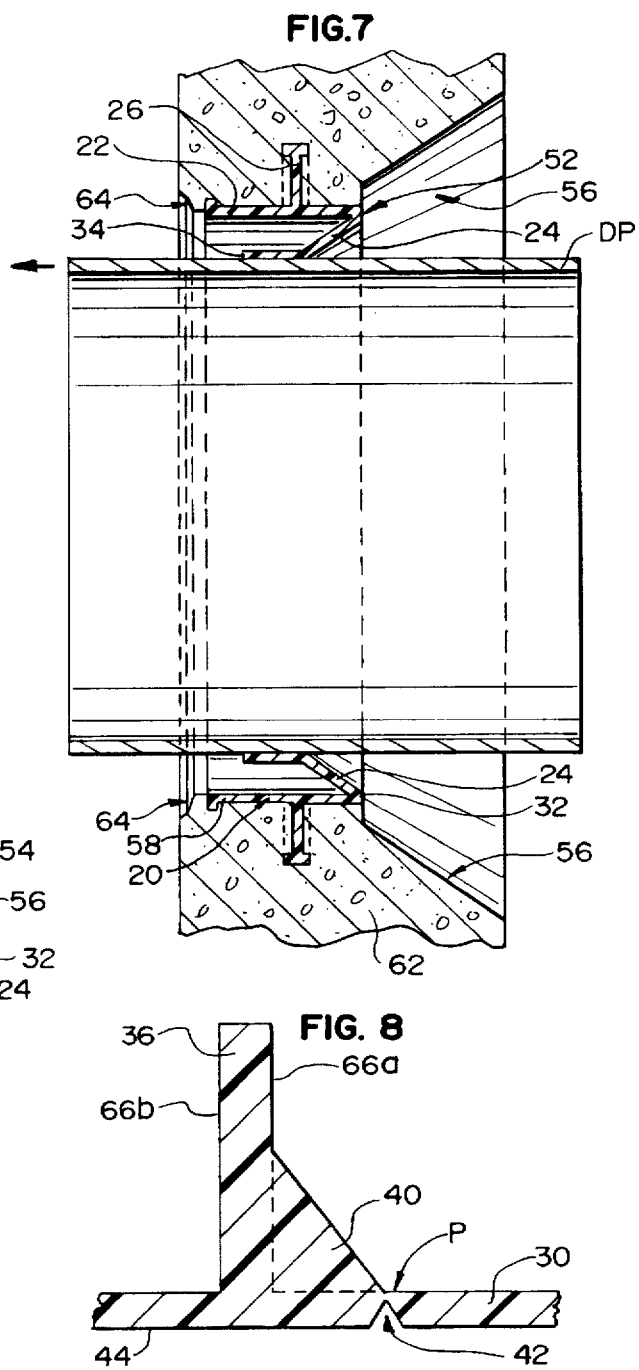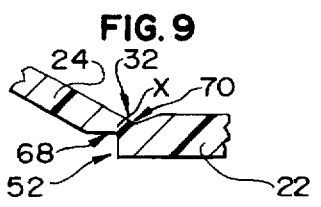

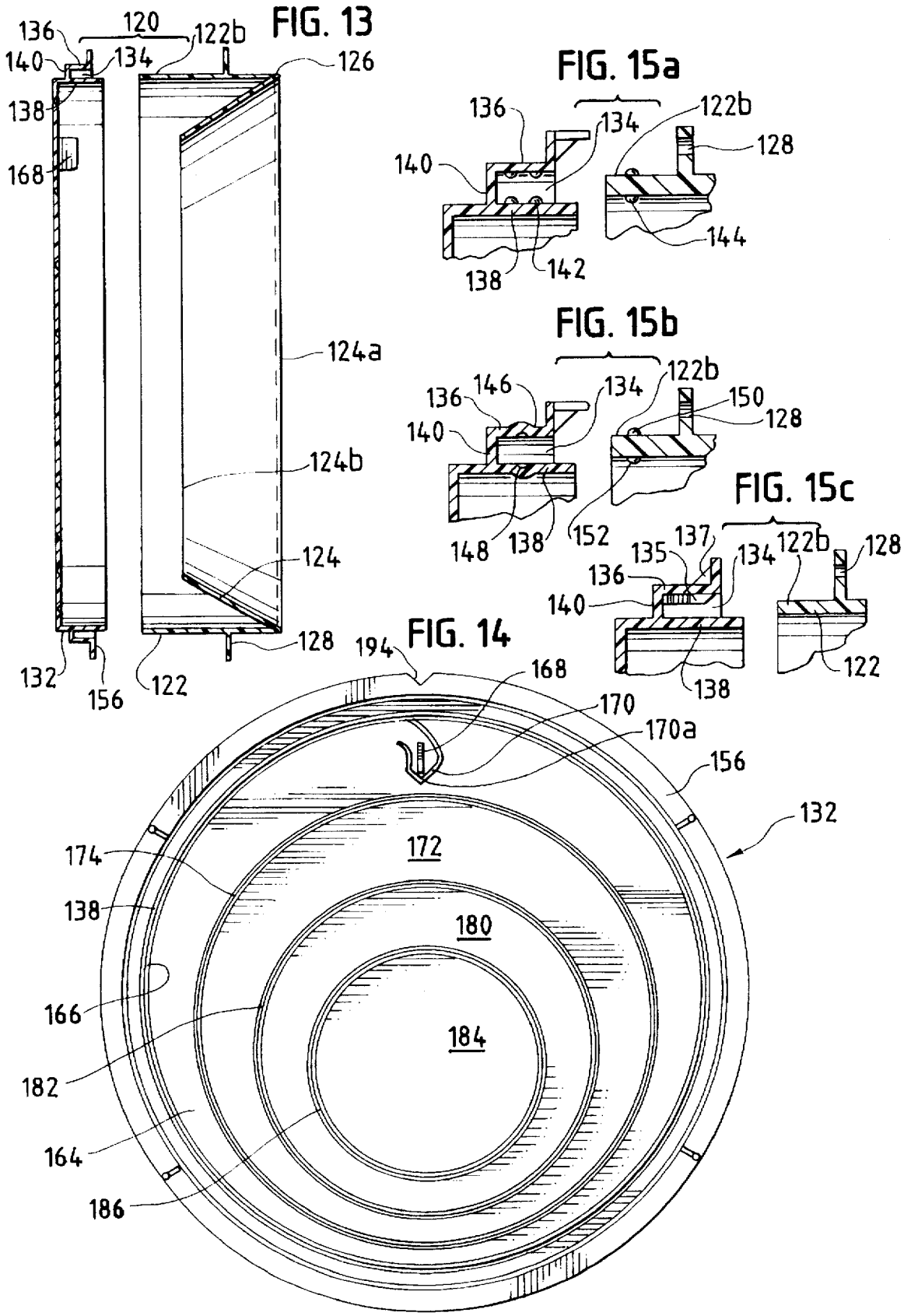

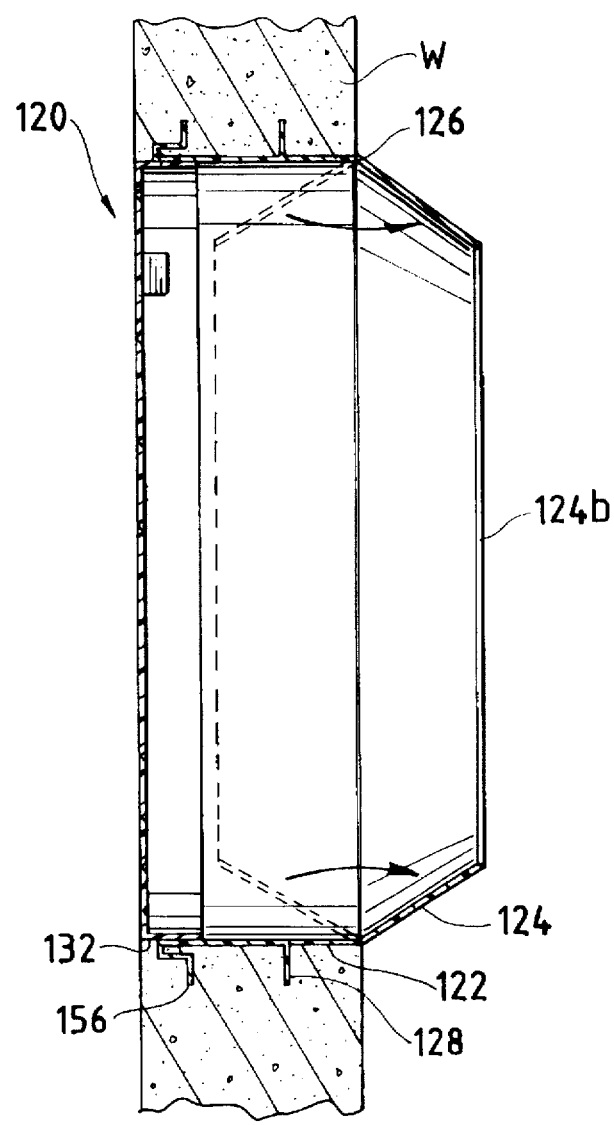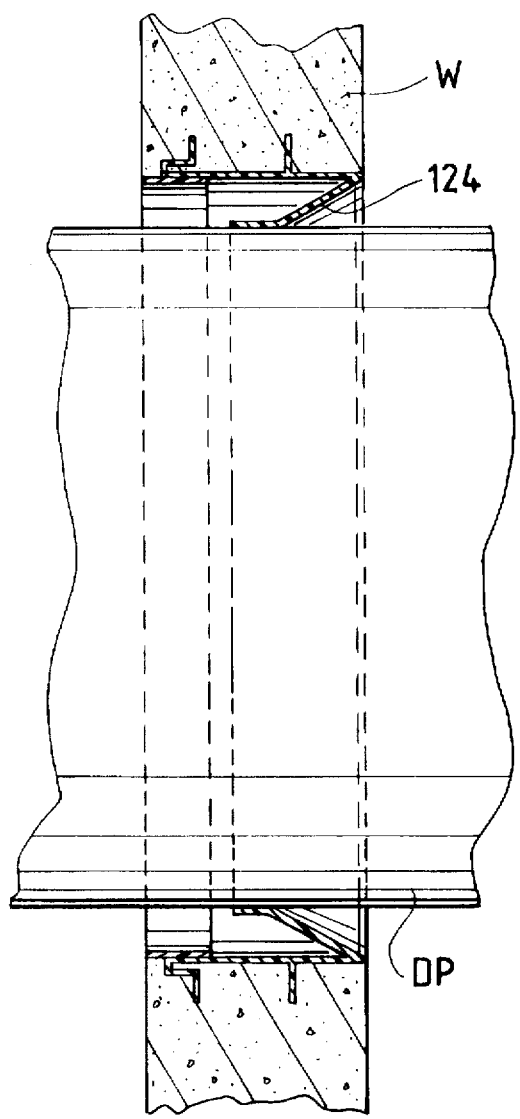

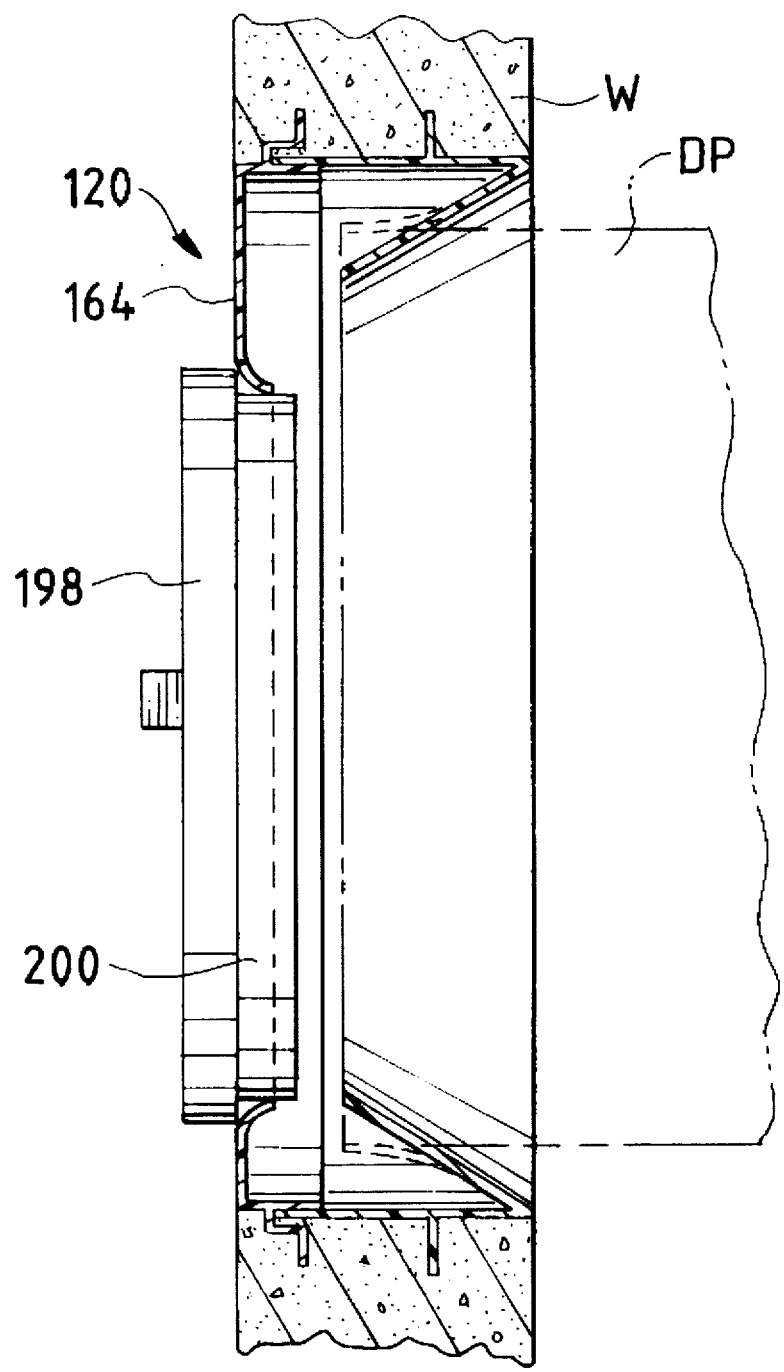

SEAL COMPONENT FOR USE IN ON-SITE POURED CONCRETE OR PLASTIC TANK OR BOX COMPONENTS OF FLUID DISTRIBUTION SYSTEMS

RELATED APPLICATIONS

This application is a continuation-in-part of application Ser. No. 08/241,019, filed May 11, 1994, now issued U.S. Pat. No. 5,624,123. The portion of the term of this patent subsequent to May 11, 2014 has been disclaimed.

BACKGROUND AND SUMMARY OF THE INVENTION

This invention relates to pipe seal components for use in the walls of on-site waste disposal products, such as poured concrete or plastic septic tanks, drop boxes, distribution boxes, and the like. Most commonly, such seal components are used to seal and accommodate a drain pipe which is inserted therein to communicate with the interior of the tank or box.

There have been several attempts to provide plastic seals which can be cast into the walls of a poured concrete septic system component during its formation. However, certain problems have arisen with several of these attempts. U.S. Pat. Nos. 4,732,397, 4,805,920 and 5,286,040 disclose one type of pipe seal for use in concrete box walls. It is formed as a one-piece unit with an integrally-formed membrane covering off the opening of its wiper seal member. However, that type pipe seal design has numerous disadvantages. One is that the user has to be very careful in removing the membrane from the operating end of the wiper seal. For example, if the wiper's operating end is at all torn or if the membrane is not properly removed (e.g., leaves a jagged edge), pipe sealing problems can arise. That is, either the wiper blade will tear further and become inoperable when a pipe is inserted through it, or the membrane will not provide a good watertight seal to the inserted inlet line or drainpipe. Further, since the casting forms used to pour the concrete box walls are often installed at a slant to vertical, this type pipe seal requires the use of specific angled spacer members or a mandrel to assure that the seal is forced completely flat against the mating form wall. However, in the typical concrete casting operation, such precise alignment is rarely achieved, such that poured concrete is often able to undesirably seep behind that type seal's wiper member. The presence of such concrete creates significant sealing problems should a pipe ever be inserted through the wiper seal. Further yet, the commercially available embodiment made in accordance with U.S. Pat. Nos. 4,732,397, 4,805,920, and 5,286,040 includes three tearaway lines, i.e., one each for 2, 3, and 4 inch pipe. However, in actual use, those "extra" tearaway lines act as inherent built-in failure points. That is, if one of such tearaway lines does not fail from associated backfill pressure exerted against the membrane, then often another one will.

U.S. Pat. No. 4,951,914 (owned by the assignee of the subject invention) discloses a two-piece pipe seal assembly which has a primary seal body with an integrally joined wiper blade, and a separate knock-out plug member which fits within an interior groove formed in the seal body's inner wall. However, that seal has the disadvantage that two pieces are required to be produced, shipped, assembled, and used. Further, unless some thickness of concrete "flash" is present (behind the membrane) to maintain the separate knock-out member in position vis-a-vis the seal body, backfill forces can push against that knock-out member sometimes causing it to be displaced. (Reference is made to U.S. Pat. No. 4,951,914 for a description of the general use, installation and operation of such polymer pipe seal assemblies.)

There have also been very similar plastic seal products which are fitted into the walls of plastic distribution box components for fluid drainage systems. One such plastic box and plastic seal component combination is disclosed in co-owned U.S. Pat. No. 4,663,036. The seal includes a wiper blade for engaging the exterior of a pipe and a sealing member may extend across the free end of the wiper blade for sealing a particular opening. Removal of the sealing member from the free end of the wiper blade can damage the free end of the wiper blade similar to the constructions described above.

One problem encountered with such concrete or plastic components is that leveling such components in the ground is difficult, and improper leveling may result in uneven flow through the drainage pipes which are inserted through the seals. In order to overcome this problem, flow control devices have been proposed for providing an eccentric opening on the end of the drainage pipes so that the openings can be leveled and control flow out of the tank or box component and through the drainage pipes. Such flow control devices are disclosed in U.S. Pat. Nos. 4,298,470 and 4,756,827. However, both of those flow control devices are attached directly to the drainage pipes. Since drainage pipes come in many sizes, a corresponding number of different sized flow control devices must be used to accommodate the different sizes of pipes. In addition, such drainage pipes are notoriously irregular and the fit between the flow control device and the pipes is often less than perfect.

SUMMARY OF THE INVENTION

An important aspect of this invention therefore lies in providing a seal with a tearaway or removable seal membrane which is located remotely from and is unconnected to the seal's wiper blade so that removing of the tearaway seal membrane cannot damage the integrity of the wiper blade's free end. The wiper blade is a frustro-conical wiper blade integrally connected to the front end of the cylindrical wall member. The tearaway or sealing membrane also seals across the back end of the seal's cylindrical wall so that concrete cannot enter behind the wiper blade which could otherwise render the wiper blade unusable. The membrane is also compatible with a leveling device which may be of universal size since it does not connect to a drainage pipe.

In one embodiment, a tearaway membrane is integrally molded with the back end of the cylindrical wall of the component and is removable to allow insertion of a pipe through the wiper blade. The tearaway membrane includes a score line and pull tab for facilitating removal. In addition, the wiper blade is pivotable between a first position in which it projects inwardly towards the tearaway membrane and a second position in which it projects outwardly away from the tearaway membrane. In the second position, the integrally molded part can be formed in an injection mold and an installer has easy access to the pull tab of the tearaway membrane. In the first position, the wiper blade is pivoted inwardly to receive a pipe.

In another embodiment of the invention, the seal is provided with a backplate which extends across and seals the back end of a cylindrical wall member of the seal. The backplate may take the form of the tearaway membrane as previously discussed, and the backplate and cylindrical wall member may be molded integrally together. However, the backplate may instead be molded separately in some embodiments so that the backplate may include several advantageous features which might otherwise be difficult to include on the seal component if it were molded integrally as one piece. When molded separately, the backplate includes a U-shaped annular groove for attaching to the cylindrical wall member. The U-shaped groove is further provided with a locking mechanism for releasably securing the backplate to the cylindrical wall member. The locking mechanism can consist of several vertical flanges spaced around the U-shaped groove and seated in the groove, so that the rear end of the cylindrical wall is pinched between the flanges and one wall of the groove. Alternatively, raised ridges on the rear end of the cylindrical wall may interlock with corresponding depressions in the U-shaped groove.

In one embodiment, the backplate component includes a sealing membrane with a plurality of circular removable portions each including an annular score line one or more of the circular removable portions may further include a pull tab for facilitating removal. However, because of the score lines, removal of any of the removable sections may also be accomplished by tapping the desired section with a blunt object such as a hammer, cutting the section along the score line, or cutting the section elsewhere and tearing it out along the score line. Each of the removable portions has a different diameter so that a selected portion can be removed to accommodate a selected size of pipe.

The inventive seal may be used for cast-in-place use in the concrete wall of a septic tank or the like and may also be used in the sidewall aperture of a plastic tank or box product such as a distribution box. In both constructions, the inventive seal may be used as a device for controlling flow out of the box component to accommodate for the box or tank being out of level.

In a poured concrete tank or box product, one of the removable portions may be removed from the sealing membrane of the backplate and a leveling device may be inserted therethrough. The leveling device includes a smooth cylindrical wall for engaging the sealing wall of the associated opening and includes a faceplate having an eccentric opening. The leveling device is rotatable within the backplate itself and a plurality of such leveling devices can be adjusted within associated seals so that the eccentric openings are leveled to control the flow of fluid out of the box. Since the leveling device is always secured to the backplate of the sealing member, and not to the associated pipe, the leveling device therefore may be of a universal size adapted to fit the aperture of the sealing member's backplate. In contrast, prior art leveling devices were affixed directly to the drainage pipes themselves which often did not form a tight fit due to variances in the pipe. Alternately, such leveling devices required angled sealing flanges to adapt variations in the pipe. The present invention, which attaches a leveling device to the backplate, overcomes the prior art problems which are encountered with forming an effective seal between a leveling device and a pipe.

In a plastic distribution box or the like, no separate leveling device is required. Instead, one of the eccentric removable membrane portions can be removed from the separate backplate member, and the backplate is then rotated relative to the rest of the sealing member whereby the backplate's eccentric opening can be leveled. Such a construction completely eliminates the requirement and cost of an additional leveling device and also eliminates the problems which are encountered with prior art leveling devices which attach directly to a pipe.

Advantageously, after removal of the appropriate circular removable portion and upon insertion of a leveling device or pipe, the opening formed expands and the remaining portion of the sealing member deforms slightly inwardly or outwardly around the leveling device or pipe, depending on the direction in which the part is pushes through the backplate. This forms, in effect, a secondary wiper blade which provide a watertight seal around the leveling device or pipe.

The circular removable portions of the backplate are positioned such that, when properly inserted, a leveling device or pipe will never touch the inner diameter of a pipe sealed in the primary wiper blade.

One object of the present invention is to therefore provide a one-piece pipe seal assembly having a primary wiper blade connected to the seal body by a living hinge member, and including tearaway membrane which seals off the seal assembly at a position remote from the wiper blade's operating end.

Another object of the present invention is to provide a tank seal assembly that is economical in manufacture and use, and which assures that no concrete can enter behind the wiper blade during the casting process within a poured concrete box wall regardless how the seal assembly is aligned on the casting mandrel.

Another object of the present invention is to provide a pipe seal assembly that can be cast in place in a concrete tank wall and which has a tearaway membrane that is so structured as to provide a permanent watertight seal when the pipe seal is not being used to receive a drainpipe.

Another object of the present invention is to provide a pipe seal assembly that is of a design that can be used with casting mandrels from various third party seal manufacturers.

Yet another object of the present invention is to provide a pipe seal component that can accommodate different size pipes to form an effective seal therewith.

Another object of the present invention is to provide a pipe seal component which can be universally used in both a poured concrete tank or box component as well as a plastic box or tank component.

Another object of the present invention is to provide a pipe seal product which can accommodate a leveling device or in which the seal's sealing membrane itself can be used as a leveling device.

Other objects and advantages of the invention may be seen in the details of the ensuing specification.

BRIEF DESCRIPTION OF THE DRAWINGS

The invention is explained in conjunction with the accompanying drawings, in which:

FIG. 1 is a front elevational view of one embodiment of the improved seal member;

FIG. 2 is a cross-sectional view of the seal member of FIG. 1;

FIG. 3 is a rear elevation view of the seal member of FIG. 1;

FIG. 4 is a side cross-sectional view of the seal member of FIG. 1;

FIG. 5 is a fragmentary sectional view of the seal of FIG. 1, depicted as cast in place in a tank wall, with a concrete flash present, and prior to removal of the tearaway membrane;

FIG. 6 is similar to FIG. 5, but shown without the presence of a concrete flash and with an enlarged chamfered opening created by the use of a spacer member during casting;

FIG. 7 is yet another fragmentary sectional view of the seal assembly of FIG. 1 as cast in a box wall, showing the tearaway membrane removed, and a pipe installed through the seal's wiper blade;

FIG. 8 is an enlarged fragmentary cross-sectional view of the gusseted pull tab portion of the tearaway membrane of the seal assembly of FIG. 1;

FIG. 9 is a rotated and enlarged fragmentary cross-sectional view of the "living hinge" connection of the seal's wiper blade to the seal's cylindrical body member;

FIG. 13 is a cross-sectional view of the seal component of FIG. 12 with the two main parts disassembled;

FIG. 14 is a plan view of the backplate of the two-piece seal component of FIG. 12;

FIG. 15a is a cross-sectional view of an alternate embodiment of the connecting and locking means of the two-piece seal component;

FIG. 15b is a cross-sectional view of yet another alternate embodiment of the connecting and locking means of the two-piece seal component;

FIG. 15c is a cross-sectional view of yet another alternate embodiment of the connecting and locking means of the two-piece seal component;

FIG. 16 is a cross-sectional view showing the two-piece seal component cast in concrete;

FIG. 17 is a cross-sectional view showing the two-piece seal component cast in concrete with a pipe inserted therethrough;

FIG. 27 is a side elevational, somewhat schematic, view of the two-piece seal component, mounted in concrete, having a leveling member rotatably seated in an aperture in the backplate and showing the deformation of the seal's wiper blade as a pipe, shown in broken lines, is inserted therein.

DETAILED DESCRIPTION OF THE PREFERRED EMBODIMENTS

Figure 10:
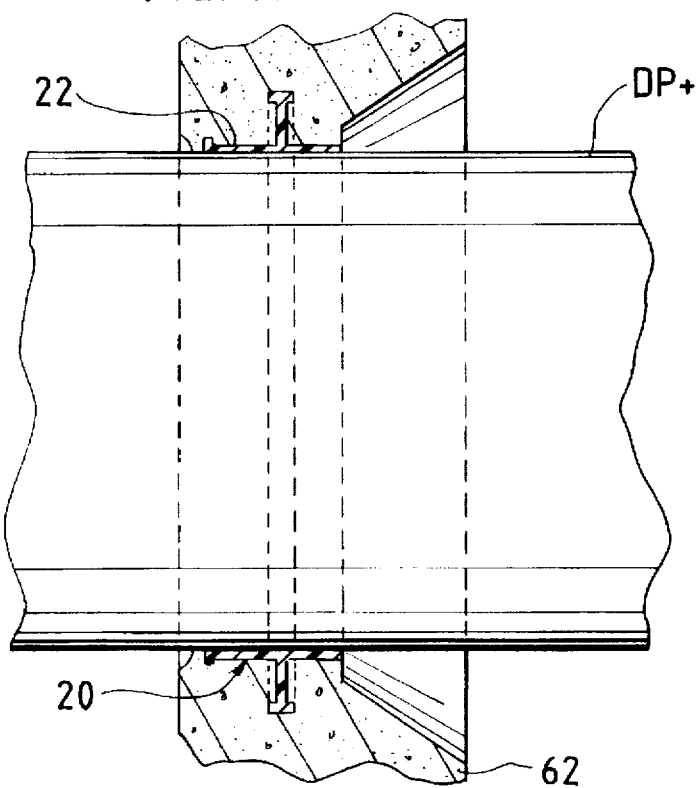
FIG. 10 is a cross-sectional view of the improved seal member with both the tearaway membrane and wiper blade completely removed so that a larger diameter pipe can be inserted therethrough.

Referring to FIGS. 1–7, the reference numeral 20 designates one embodiment of a seal assembly of the present invention. Seal assembly 20 includes a cylindrical wall member 22, a radially inwardly projecting, frustro-conical shaped wiper blade 24, a radially outwardly projecting integral anchor flange 26, and a generally axially extending flange 28 formed at the periphery of flange 26. The seal 20 also includes a backplate which takes the form of an integrally formed tearaway membrane 30 which extends completely across the back end of wall member 22 so as to cover and seal off the same. The wiper blade 24 is integrally connected to wall member 22 by a living hinge 32 and at its other end has a free or operating end 34. As will be seen, the integrity of the free end 34 is critical in the proper operation of the seal assembly 20 to receive and retain a drainpipe in a watertight sealed condition and to grip a mandrel during installation.

FIG. 2 depicts the seal assembly 20 in cross section and shows the living hinge 32 integrally attaching the wiper blade 24 to cylindrical wall 22. A pull tab member 36 is integrally formed preferably at the center of membrane 30 and projects inwardly, i.e., into the interior of the seal member 20. A peripheral score line 38 is formed at the juncture of membrane 30 with cylindrical seal wall 22, to permit ready removal, i.e., severance, of membrane 30. The position of the wiper blade 24 is shown in phantom outline after it has been folded inwardly about living hinge 32. FIG. 2, thus, reflects in solid lines the actual outwardly-projecting position of wiper blade 24 when the seal assembly 20 is manufactured (i.e., preferably by injection molding), while the phantom lines show the wiper blade's inwardly folded position for use when the seal assembly 20 is fitted on a mandrel 48 (see FIG. 4) for casting into a concrete box wall, as well as for sealably receiving a pipe component inserted therethrough.

Referring to FIG. 3, tearaway membrane 30 includes a peripheral score line 38, a pull tab member 36, and a pyramid-shaped pull tab support gusset 40 (formed integrally between the tearaway membrane 30 and the pull tab 36 (in broken lines), and rising to support the latter—see also FIG. 2). Further, a configured arcuate-shaped score line 42 starts at point S (in FIG. 3), curves concavely towards the pull tab member 36, is generally triangularly-shaped as it abuts the support gusset 40, and then is generally concavely shaped through the central portion of the tearaway membrane 30 until it tangentially joins the outer peripheral score line 38.

As best seen in FIGS. 2 and 3, score lines 38 and 42 are formed as depressions or V-shaped notches on the exterior side 44 of membrane 30; the interior side of tearaway membrane 30 is preferably smooth-walled. In one embodiment made in accordance with the present invention, the tearaway membrane 30 was approximately 0.060 in. thick, while the thickness of the membrane along each of the score lines 38, 42 was only approximately 0.010 in. thick. Preferably, the entire seal assembly 20 is formed as an injection-molded plastic component, and is preferably made of linear low density polyethylene. One preferred linear low density polyethylene material used to mold the seal assembly 20 is sold by Dow Chemical Company, as its product "DOWLEX 2517".

Referring to FIG. 4, the free end 34 of inwardly-folded wiper blade 24 is releasably retained, i.e., snap-fitted, upon the cylindrical mouth portion 46 or gripper element of a suitable casting mandrel 48. (Reference is again made to the description found in U.S. Pat. No. 4,951,914 for how a mandrel is used to grip and hold a pipe seal assembly, via its flexible wiper blade, in ready position for casting-in-place within the side wall of a poured concrete box, such as a poured concrete septic tank wall.) In any event, as seen, the projecting mouth portion 46 of mandrel 48 acts to slightly stretch the free end 34 of wiper blade member 24, thereby to tightly, but releasably, retain the same on the mandrel during the casting process. Mandrel mouth portion 46 is somewhat removed from the inner surface 44 of the tearaway membrane 30. Also, the inwardly projecting pull tab member 36 of membrane 30 lies within a cavity (labelled "C" in FIG. 4) formed within the mandrel mouth 46.

During the casting process, the mandrel 48 is attached to a casting form side wall (not shown) through use of an appropriate threaded fastener or other connector (not shown). Thereafter, once the seal member 20 (as held on a mandrel 48) has been cast within a concrete tank wall (not shown), the mandrel mouth 46 is released, i.e., removed, from the wiper blade's free end 34 at the time the casting form side wall (not shown) is removed, i.e., stripped, from the tank wall. Thus, it will be seen that no concrete or other undesired material can seep or otherwise flow into the area noted by reference letter X, i.e., that important free area behind the wiper blade 24, even should the seal assembly 20 not be placed totally flush against the mating inner form wall 49. This is because both the mandrel 48 and the integral membrane 30 prevent anything from entering that space X, regardless of the actual positioning or canting of seal member 20 vis-a-vis the opposing form wall 49.

Referring to FIG. 5, the improved seal 20 is cast into a relatively thin tank wall 50 (formed of poured concrete). The receiving end 52 of seal 20 (which end includes the living hinge 32) has been so cast as to lie flush with the right side (see FIG. 5) of tank wall 50. However, in the typical installation in which the receiving end 52 is formed flush with the tank wall 50, i.e., usually for a wall thickness of approximately 1½ inches, there is created during casting a concrete flash (marked "F" in FIG. 5) as situated behind the tearaway membrane 30. It is to be understood that while not at all necessary to preserve the structural integrity of tearaway membrane 30, that flash F actually aids in keeping seal 20 as a "closed" seal, i.e., one in which the flash F and membrane 30 remain present. This feature is quite helpful when such a cast-in-place seal 20 is to remain closed, as occurs in multiple-port tanks where only one or two openings, for example, are actually needed to sealably receive drain lines. The anchor flange 26 and axial flange 28 help retain the seal assembly 20 in place once seal 20 is cast in concrete.

Turning to FIG. 6, a seal assembly 20 is cast within a somewhat thicker tank wall 54, again formed of poured concrete. An enlarged chamfered opening 56 is created by the use of a spacer member (not shown) during the tank wall casting process. (Reference is again made to U.S. Pat. No. 4,951,914 for a description of the use of such a spacer as mounted atop a mandrel.) However, in this case, even though the tank wall 54 is somewhat wider, for example, approximately 2.5 inches, no concrete flash F is formed and present behind the tearaway membrane 30. The membrane 30 and the outer edge 58 of cylindrical seal wall 22, i.e., the left edge of seal 20 in FIG. 6, lie flush with the left or interior wall surface 60 of thick tank wall 54. Thus, tank seal assembly 20 can be so positioned on a mandrel 48 as to have its outer edge 58 forced directly against the opposing or inner core wall (for example, see form wall 49 in FIG. 4) when casting such a thick tank wall 54. However, it will also be noted that the outer or receiving end 52 of seal assembly 20, in the specific tank wall construction as shown in FIG. 6, is located internally of the thick tank wall 54, rather than lying adjacent the outer side surface of tank wall 50 in FIG. 5, for example. In any event, the tearaway membrane 30 is of sufficient structural strength as to remain in place when installed, even without the presence of any concrete flash F, due to the specific configuration of the membrane 30 and the score lines 38, 42.

FIG. 7 depicts a seal assembly 20 cast in place in an even thicker concrete tank wall 62; a chamfered spacer opening 56 is present but the concrete flash F has been removed to leave a flashing void or opening 64. As seen, similar to FIGS. 5 and 6, the anchor flange 26 of seal 20 is embedded into the concrete so as to hold the seal 20 in its correct position. Further, the tearaway membrane 30 has already been removed. The latter can be readily accomplished by using a pair of pliers or some other gripping element to pull on the pull tab (i.e., to the right, for example, in FIGS. 6 and 7), until tab 36 and the support gusset 40 cause the pointed base portion "P" (see FIGS. 1, 3, and 8) of the score line 42 to tear open from the remainder of the tearaway membrane 30. Thereafter, further pulling on pull tab 36 causes continued tearing of the score lines 42 (along both sides of tab 36), until the larger of score lines 42 reaches the peripheral score line 38. Yet continued pulling of pull tab 36 then causes the tearaway membrane 30 to be completely severed from the cylindrical seal wall 22 (along the remainder of peripheral score line 38). Alternatively, it is recognized that the tearaway membrane may be removed by striking it with sufficient force to separate it along the score line. Once the membrane 30 has been fully severed, it can be discarded. Yet this is accomplished without any worry of inadvertently damaging the operating end 34 of wiper blade 24, from which the tearaway membrane and score lines 38, 42 are totally removed.

Then a suitable-sized drainpipe, such as denoted by reference letter "DP" in FIG. 7, can be slidably inserted into the seal assembly 20 from the right side (of FIG. 7), i.e., into the seal's receiving end 52. That is, the pipe DP can be inserted into the flexible wiper blade member 24 (in the direction of the arrow in FIG. 7) until it engages and then stretches slightly outwardly the wiper blade's operating or free end 34. Continued insertion of a pipe DP into free end 34 finally causes the latter to reach its gripping and sealing position shown in FIG. 7. By this process a substantially watertight seal is created about pipe DP by the inwardly directed compression forces of the flexible but stretched wiper blade free end 34.

FIG. 8 depicts a substantially enlarged fragmentary section view of pull tab 36 and surrounding membrane 30. As seen, the arcuate-shaped score lines 42 (as well as peripheral score line 38) are each formed as a slight V-groove or depression in the exterior surface 44 of tearaway membrane 30. In the preferred embodiment, the score lines 42 (and 38) are each formed as a 60° notch formed in the exterior surface 44 of tearaway membrane 30. However, that V-notched area (comprising the score lines 38 and 42) is not so sufficiently deep as to affect the structural integrity of membrane 30, should the latter be required to be maintained in place during use. In fact, the area of membrane 30 remaining along each of score lines 38, 42 is substantially more structurally secure than that of the membranes of many prior art pipe seal designs; in use the latter often cave in and tear away due to backfill pressure around a buried concrete box. Stated another way, the presence of a pull tab 36 allows the use of a plier, for example, to forcibly remove the membrane 30. Thus, the material of membrane 30 adjacent score lines 38, 42 can be substantially thicker or preferably tougher than otherwise, such that the membrane 30 is more structurally secure than many prior art pipe seal devices. The planar walls 66a, 66b comprising the sides of pull tab 36 are also formed with a slight negative slope solely for the purpose of injection molding.

FIG. 9 depicts a substantially enlarged fragmentary section view of the living hinge 32, rotated 180° from its position as shown in FIG. 2, for example. As formed, the peripheral edge of cylindrical seal wall 22, at least towards its receiving end 52, starts to slightly taper in thickness, i.e., creates an annular reduced wall section. Correspondingly, the wall thickness of wiper blade 24 also begins to slightly taper at its end opposite from free end 34, i.e., creates an annular reduced wall thickness. Such tapering causes a reduced section connection, as designated by reference letter Z in FIG. 9, to be created at the location of living hinge 32. More specifically, a generally perpendicular outer wall angle 68 is formed at the radially outer connection of wiper blade 24 with cylindrical wall 22, while an obtuse inner wall angle 70 is formed on the radially inner connection of wiper blade 24 with cylindrical wall 22.

Preferably, as noted in FIG. 9, the apex of angle 68 resides slightly axially outwardly (i.e., to the left in FIG. 9 along cylindrical seal wall 22) from the apex of inner wall angle 70. This preferred specific positioning of the respective apexes of inner and outer wall angles 68, 70 creates the reduced section Z of living hinge 32, which hinged connection is formed annularly about receiving end 52 of seal member 20. Importantly, this arrangement operates to create a sufficiently pliable yet structurally strong living hinge 32 so that wiper blade 24 can be initially formed as projecting outwardly (see FIG. 2) and can then be later folded or flipped inwardly to its normal operating or "use" position (FIGS. 2, 4, 5) or removed as described in more detail herein below.

Further, because of the specific polymer material preferably used (i.e., a suitable linear low density polyethylene material as described above) for seal member 20, the present seal assembly's living hinge 32 truly becomes "living". That is, it is flexible enough to permit the required inward "flipping" of wiper blade member 24 (from its initial injection molding position to its inwardly projecting "use" position) without affecting whatsoever its structural integrity. In one embodiment made in accordance with the invention, the thickness of wiper blade 24 was in the range of approximately 0.025 to 0.030 inches, the thickness of cylindrical wall 22 was in the range of approximately 0.055 to 0.060 inches, and the thickness of the living hinge's cross section Z was in the range of approximately 0.015 to 0.020 inches.

Referring to FIG. 10, the seal assembly 20 is shown cast in a concrete wall 62 with both the seal membrane 30 and the wiper blade 24 are completely removed. The sealing membrane 30 may be removed as previously described and the wiper blade 24 may be removed by cutting the wiper blade 24 lengthwise and then tearing along the living hinge 32. Such modification of the seal 20 allows a larger pipe DP+ to be inserted through a seal member 20 if desired as shown in FIG. 10. The pipe DP+ may be sized to fit tightly within cylindrical wall 22 to form a tight fit, or if there is a slight discrepancy in size, a suitable sealing agent, such as silicone caulk, can be applied to the juncture between the cylindrical wall member 22 and the pipe DP+ to form an effective fluid-tight seal.

Figure 11:
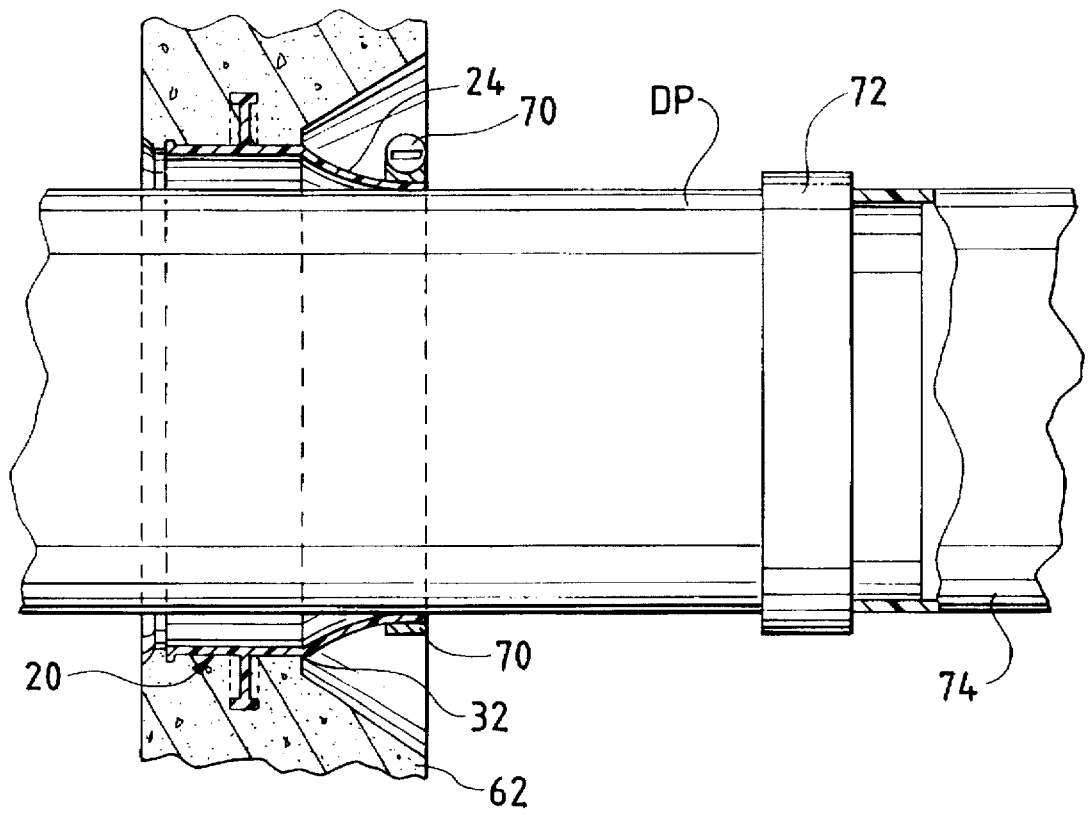
FIG. 11 is a cross-sectional view of the improved seal member with a pipe inserted through the wiper blade when it is in the outer position and with a radiator clamp encircling same for providing a high-pressure seal.
Figure 12:
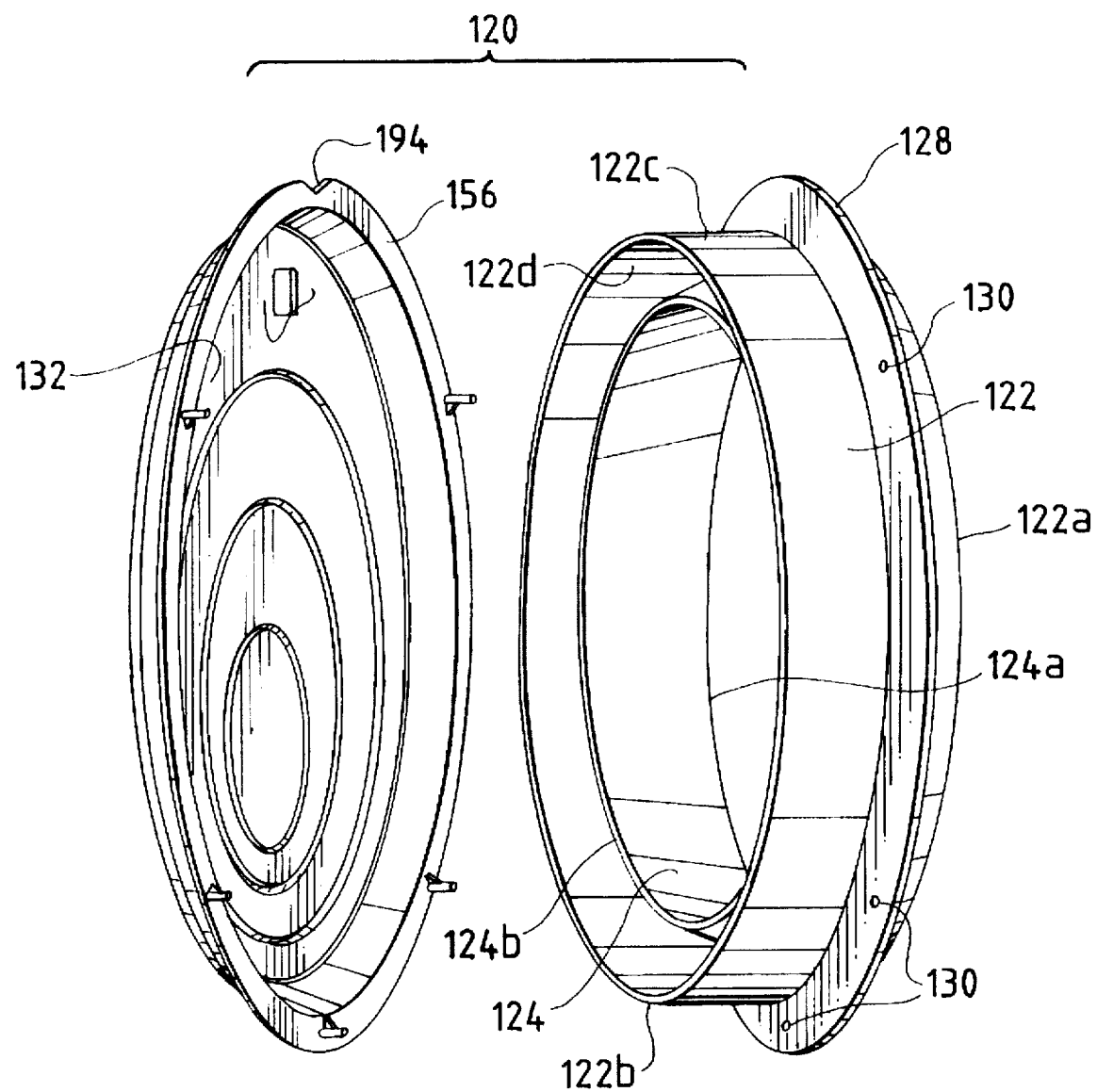
FIG. 12 is a perspective view of an alternate embodiment of an improved two-piece seal component.

Another use of the seal assembly 20 is shown in FIG. 11. In FIG. 11, the seal assembly 20 is cast in a concrete wall 62, the tearaway membrane 30 is removed, and a drainpipe DP is inserted from the inside of the tank through wiper blade 24 while it is in the outer position. A conventional radiator clamp 70 is fixed about the wiper blade 24 for forming a high-pressure seal with drainpipe DP. Since the drainpipe DP is inserted through the seal from inside the tank or box, it is preferably short as shown in FIG. 11. A flexible pipe connector 72 is connected to drainpipe DP for connecting it to yet another pipe 74. Advantageously, the pipe connector 72 may take the form of a pipe connector such as disclosed in co-owned U.S. Pat. No. 5,335,945 or some other commercially available pipe connector. As described in detail in that patent, such a connector 72 can be used to connect the drainpipe DP to many types of pipe, such as plastic pipe, corrugated pipe, or the like.

The improved pipe seal assembly 20 of FIGS. 1–11 can be inexpensively formed in one piece because of the presence of the living hinge 32. The seal 20 can be formed as one piece via injection molding with the wiper blade 24 in the flipped out position and the wiper blade can then be flipped to an inwardly-directed "use" position. (Any injection molding of a pipe seal component where the wiper blade was permanently inwardly mounted and the membrane was mounted across the back of the seal would be commercially impossible to make from an injection mold tooling standpoint.) The tearaway membrane 30 is also advantageously located at a position totally removed from the free end of wiper blade 24. Such placement is a substantial improvement over prior art designs where removal of a seal membrane from the operating or free end of the wiper blade often completely destroyed the flexible wiper's usefulness. Further, the seal assembly 20 is made as one piece so that extra concrete "flash" is not required to hold the seal membrane in place when in use. Another important feature of the improved pipe seal assembly of the present invention is that it will readily snap-fit into other commercially available mandrels, such as, for example, those available from the owner of U.S. Pat. Nos. 4,732,397, 4,805,920, and 5,286,040.

While the seal assembly 20 described in connection with FIGS. 1–11 may advantageously be integrally molded as one piece, the seal component of this invention may also be formed from multiple parts which are then later assembled to form a one-piece seal component. Molding the parts separately allows certain parts to be made more intricate and include more features which otherwise may be difficult to incorporate into the assembly due to the complexity of forming such intricate features in a single molding step.

Another important aspect of this invention therefore lies in providing a multi-function seal component for on-site use in the walls of poured concrete or plastic tanks or distribution boxes for fluid distribution systems. The inventive seal component can be formed as an integral one-piece part or may preferably be formed as two parts which are later assembled so that during the molding process the individual parts can include additional features and functions.

Referring to FIGS. 12–26, the numeral 120 generally designates a two-piece pipe seal assembly of the present invention. The seal assembly 120 includes a cylindrical wall member 122 having a front end 122a, a back end 122b, an outer surface 122c and an inner surface 122d. The seal assembly 120 further includes an angled wiper blade 124 having a first end 124a and a second free end 124b. The first end 124a of wiper blade 124 is connected to the front end of 122a of cylindrical wall member 122, and the first end 124a of wiper blade 124 has a larger diameter than a diameter of the free end 124b. The free end 124b is free to expand and frictionally engage the exterior of a pipe when it is inserted therethrough. Preferably, the first end 124a of wiper blade 124 is connected to front end 122a of wall member 122 by a living hinge 126 (FIGS. 13 and 16) which allows wiper blade 124 to be flipped between a first position in which it projects inwardly and a second position in which it projects outwardly. While the wiper blade 124 need not be flippable in this embodiment for molding purposes, wiper blade 124 is still preferably flippable to an outer position to allow for greater access to the interior of the seal as described in more detail herein below.

A radially-extending anchor flange 128 is provided on the outer surface 122c of cylindrical wall member 122 for anchoring the seal assembly 120 in concrete. Preferably, the anchor flange 128 includes a plurality of apertures 130 which allow concrete to flow through flange 128 and lock it in place. The anchor flange 128 may also take the form of an anchor flange 26 as previously described. In addition to serving to lock the seal member in a concrete wall, the anchor flange 128 may also serve to secure seal Component 120 in an aperture in a plastic distribution box as disclosed in more detail herein below.

The seal assembly 120 also includes a generally circular backplate 132 which extends across and seals the back end 122b of cylindrical wall member 122 when the two parts are joined. Connecting means are provided for releasably connecting backplate 132 to cylindrical wall member 122. The connecting means may take the form of an integrally molded score line 38 as discussed in previous embodiments. However, when it is desirable for the seal assembly to be made as two parts, the connecting means preferably takes the form as described below in FIGS. 12–26.

In particular, the connecting means comprises a U-shaped groove 134 which is adapted to receive the annular edge of back end 122b of cylindrical wall member 122. In the illustration given, the U-shaped groove 134 is defined by an inner first cylindrical portion 138 and an outer second cylindrical portion 136, spaced apart from one another and separated by a radially-extending intermediate portion 140. The U-shaped groove 134 receives the back end 122b of cylindrical wall member 122 as shown in FIG. 16, and backplate 132 and cylindrical wall member 122 are thus assembled as a one-piece seal component 120.

The connecting means preferably include locking means for releasably locking the back end 122b of cylindrical wall member 122 in U-shaped groove 134. In the embodiment given in FIG. 15a, the locking means take the pair of radially-extending annular ribs 142 provided on the outer surface of the inner first cylindrical portion 138 of the U-shaped groove 134, a second pair of radially-extending annular ribs provided on the inner surface of the outer second cylindrical portion 136, and a pair of diametrically opposed second radially-extending annular rib 144 provided on the back end 122b of cylindrical wall member 122. When the back end 122b of cylindrical wall member 122 is inserted into U-shaped groove 134, the rib 144 is pushed axially behind one of the ribs of each of the first and second pair of ribs, which results in releasably locking the annular rib 144 between the first and second pairs of ribs, thus restraining rib 144 and wall member 122 from moving away from the backplate 132.

In the embodiment given in FIG. 15b, the locking means take the form of diametrically-opposed recesses 146 and 148 which are respectively provided on the inner surface of the outer second cylindrical portion 136 and the outer surface of the inner first cylindrical portion 138 of U-shaped groove 134. Corresponding diametrically-opposed radially-extending ribs 150 and 152 are provided on back end 122b of cylindrical wall member 122 for engagement with recesses 146 and 148. When cylindrical wall member 122 is inserted into U-shaped groove 134, the ribs 150 and 152 are respectively received in the recesses 146 and 148 so that relative movement of the two parts is restrained and the parts are releasably locked together.

As shown in FIG. 15c, U-shaped groove 134 is preferably wider than the thickness of wall member 122 so that wall member 122 will easily fit or slide into groove 134 and the locking means then retains wall member 122 within groove 134. In the embodiment shown in FIG. 15c, the locking means take the form of a plurality of elongate members 135 positioned within groove 134 for pressing wall member 122 against inside wall 136 of the groove and locking it in place. In any event, it will be understood that the locking means may take various forms for securely but releasably locking backplate 132 to cylindrical wall member 122.

The locking means may also include a locking flange 156 on backplate 132 which projects radially outward beyond the outer surface 122c of the cylindrical wall member 122. The locking flange 156 is shown being molded integrally with the outer cylindrical portion 136 of U-shaped groove 134. When backplate 132 and cylindrical wall member 122 are assembled and cast in concrete, the concrete engages both locking flange 156 and anchor flange 128 to securely hold the two components together.

Locking flange 156 may be supported by a plurality of integrally molded triangular wedges 137 adjacent the elongate members 135. (See FIG. 15c).

The backplate 132 includes a sealing membrane 164 which extends across and seals the back end 122b of cylindrical wall member 122 when backplate 132 and cylindrical wall member 122 are assembled. The sealing membrane 164 may take the form of a tearaway membrane 30 as described in connection with previous embodiments. However, the sealing membrane 164 may advantageously take the form of the construction shown in, for example, FIGS. 12 and 14.

Figure 18:
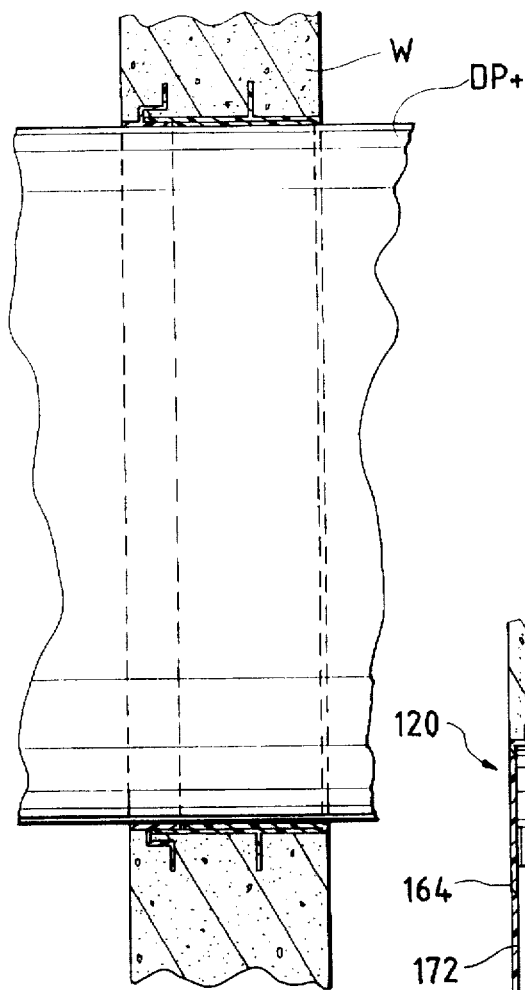
FIG. 18 is a cross-sectional view showing the two-piece seal component cast in concrete with a different diameter pipe inserted therethrough.

In particular, the sealing membrane 164 includes a first annular score line 166 which interconnects sealing membrane 164 with the inner cylindrical portion 138 of U-shaped groove 134 (see FIG. 13). The score line 166 facilitates removal of sealing membrane 164 from backplate 132 when it is desired to insert a pipe through wiper blade 124. A pull tab 168 is provided adjacent the score line 166 for facilitating tear-out of the membrane 164 such as by using a pliers in the manner described for FIG. 8. As shown in FIG. 14, sealing membrane 164 further includes a first configured score line 170 which connects with first annular score line 166 and includes a V-shaped portion 170a. Preferably, pull tab 168 is located within V-shaped portion 170a. In use, an installer uses a plier to grip pull tab 168, severs the configured score line 170 by pushing or pulling on the pull tab (or uses a knife), and then pulls that section outward and rips the entire sealing membrane 164 out along annular score line 166. Removal of the entire sealing membrane 164 is desirable when an installer wishes to install a full-size pipe through wiper blade 124 such as shown in FIG. 17. The wiper blade 124 acts to form an effective frictional seal about an exterior of drainage pipe DP in the same manner discussed in connection with the embodiment shown in FIGS. 1–11. FIG. 18 shows a larger diameter pipe, DP+, inserted through seal component 120. In addition, wiper blade 124 may instead be removed to insert an even a larger pipe through seal component 120. In such a construction, the inner cylindrical portion 138 of U-shaped groove 134 forms an effective water-tight seal with such a pipe.

The backplate 132 and sealing membrane 164 may also include a plurality of means for inserting smaller sized pipes through the sealing membrane 164 and forming an effective water-tight seal therewith. In the embodiments given in the illustrations, sealing membrane 164 includes a first removable portion 172 having a second annular score line 174 with a diameter less than the diameter of the first annular score line 166. The sealing membrane 164 also includes a second removable portion 180 having a third annular score line 182, and a third removable portion 184 having a fourth annular score line 186. The diameter of the third annular score line 182 is less than the diameter of the second annular score line 174, and the diameter of the fourth annular score line 186 is smaller than the diameter of the third score line 182. Advantageously, the sealing membrane if formed from a stretchable elastomeric material.

Figure 19:
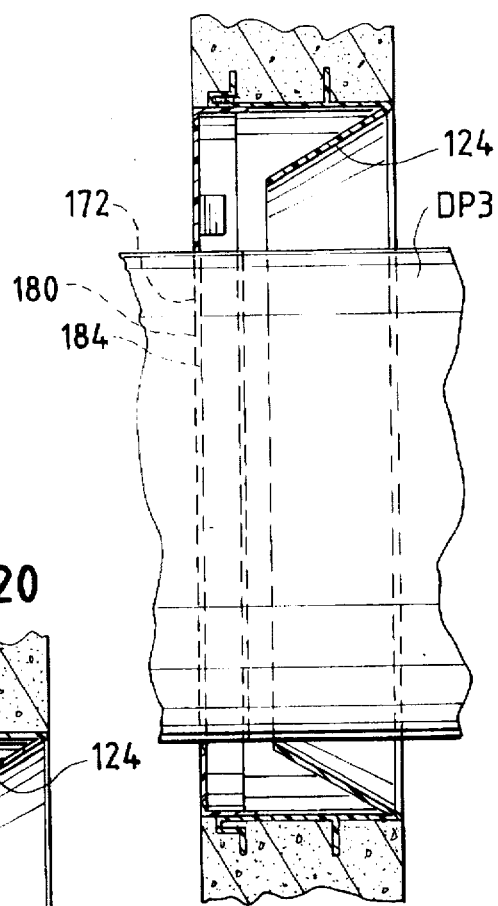
FIG. 19 is a cross-sectional view showing the two-piece seal component cast in concrete with a different diameter pipe inserted therethrough.
Figure 20:
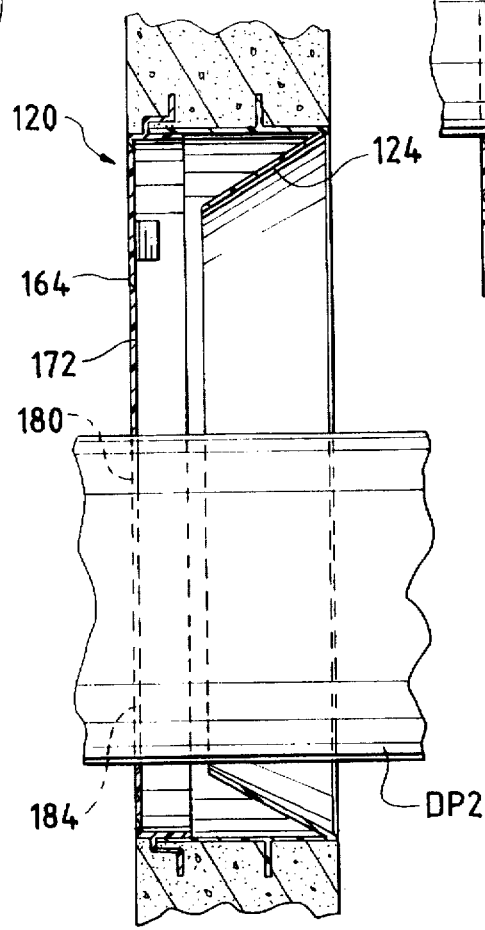
FIG. 20 is a cross-sectional view showing the two-piece seal component cast in concrete with a different diameter pipe inserted therethrough.

In use, the seal component 120 is cast in a concrete wall W and a selected portion of the sealing membrane 164 is removed to insert a desired size of pipe through the seal 120. In the embodiment shown in FIGS. 17 and 18, the entire sealing membrane 164 is removed and a pipe DP is inserted through wiper blade 124 in FIG. 17 and a pipe DP+ is inserted through cylindrical portion 138 in FIG. 18. In FIG. 19, the removable portions 172, 180, and 184 (shown in phantom) are all removed and a smaller sized drainpipe, such as a 3" drainpipe, DP3 is inserted through sealing wall 188. In FIG. 20, only removable portions 180 and 184 are removed from sealing membrane 164 and a yet even smaller drainage pipe, such as a 2" drainage pipe, DP2 is inserted through sealing wall 190. Alternatively, for inserting yet an even smaller drainage pipe through the sealing wall, such as a 1.5" pipe, only removable portion 184 is removed.

Removable portions 172, 180, and 184 are sized smaller than the outer diameter of respective drainage pipes fitting through the sealing wall when one or more of the portions are removed. In this manner, upon insertion of the pipe the remaining, unremoved portion of the sealing wall deforms slightly inwardly or outwardly, depending on the direction in which the pipe is pushed through the sealing wall. The opening in the flexible sealing wall also stretches slightly to fit the pipe. As a result, the sealing wall creates a wiper blade-like seal around the pipe.

In preferred embodiments, the seal membrane 164 is capable of being removed in separate sections so as to receive standard pipes having outside diameters such as between 4.8" and 1.8" as shown in FIGS. 17–20. The approximate preferred dimensions for the removable portions 184; are 1.510" for the smallest removable portion; 2.010" for removable portion 180; and 2.960" for removable portion 172. These sizes advantageously allow tight sealing of standard Schedule 40 1.5", 2", 3" or 4" pipe (standard measurements are to inner diameter), as well as standard ASTM 30–34 1.5", 2", 3" or 4" pipe.

Each of the score lines 174, 182, and 186 are positioned such that even when a pipe DP is inserted through a corresponding removed portion of the sealing membrane 164, such a pipe DP will not have any contact with wiper blade 124 or with a pipe inserted through the cylindrical wall member 122.

The backplate 132 further includes indicating means for indicating the top of the backplate 132 so that common radial portion 194 will be at its lowest point and aligned with the free end 124b of wiper blade 124 when assembled. In the embodiment given in FIGS. 12 and 14, the indicating means take the form of a cast in a concrete wall W, the indicating member 194 is used to place the backplate 132 in its proper orientation.

Figure 21:
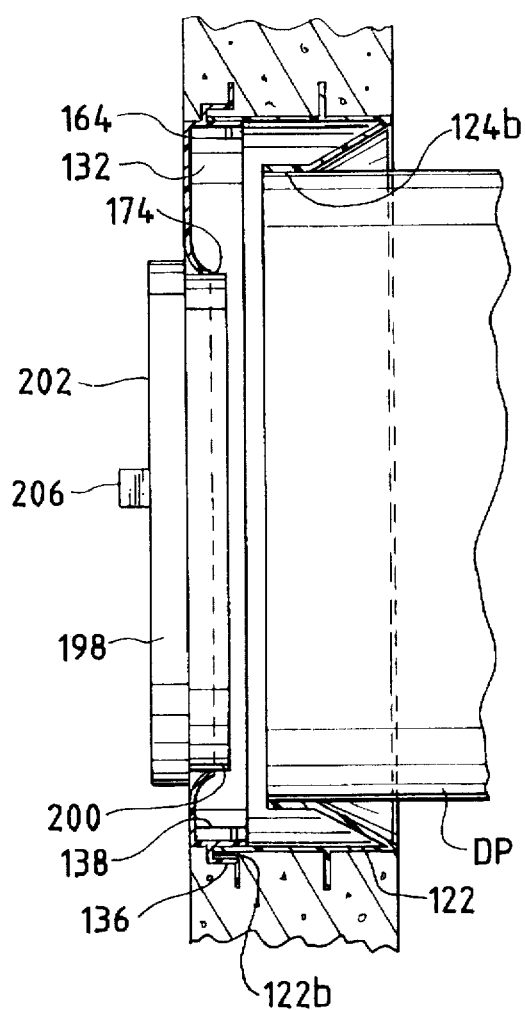
FIG. 21 is a cross-sectional view showing the two-piece seal component case in concrete with a pipe inserted therein and a leveling device seated in an aperture in the backplate.
Figure 22:
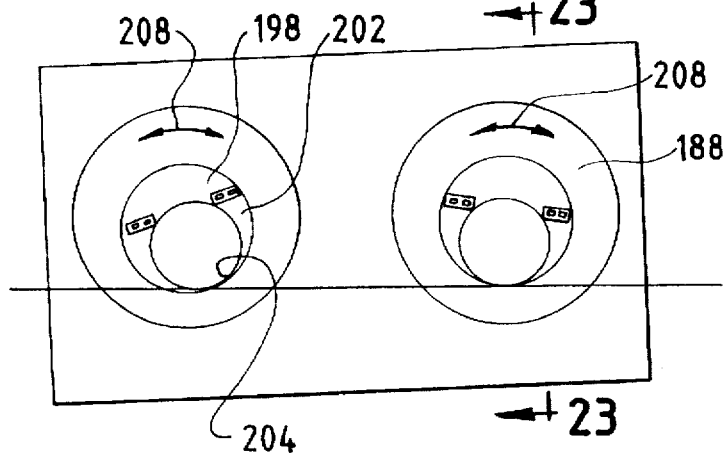
FIG. 22 is an elevational, somewhat schematic, view of the interior wall of a septic tank with two of the two-piece seal components of this invention cast therein and further including leveling devices.
Figure 23:
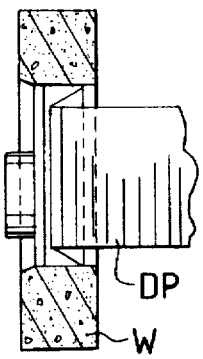
FIG. 23 is a cross-sectional view taken along line 23—23 of FIG. 22.

Another important aspect of this invention lies in combining a leveling device for seal component 120 for controlling the flow of fluids out of the box and into drainage pipes. Referring to FIGS. 21–23, a pipe DP is inserted into wiper blade 124 so that it engages the wiper blade's free end 124b and forms an effective seal therewith and terminates at the backplate. However, the pipe DP is not inserted through backplate 132. Instead, the intermediate removable portion 172 is removed from backplate 132 to leave an aperture 196 defined by score line 174. A leveling device 198 is then inserted into sealing wall 188. As shown in FIG. 21, inner cylindrical portion 138 is axially longer than outer cylindrical portion 136 so that the sealing membrane 164 which is attached to cylindrical portion 138 is removed axially outward further away from the back end 122b of cylindrical wall member 122. This provides more room for the pipe DP to be inserted in wiper blade 124; otherwise, if the pipe is not sufficiently inserted into the seal, it may undesirably tilt or slant.

The leveling device 198 includes a cylindrical flange 200 which is sized to engage and slightly stretch radially outward sealing wall 188 for forming a water-tight seal therewith while still allowing the leveling device 198 to be rotated in the radial direction. As the leveling device 198 is inserted into the aperture 196, the remaining, unremoved portion of the sealing wall expands slightly and deforms slightly inwardly to create a wiper blade-type seal around the cylindrical flange 200. The leveling device 198 also includes a faceplate 202 having an eccentric opening 204. The faceplate 202 includes a plurality of knobs 206 for facilitating rotation of a leveling device 198 within sealing wall 188 as generally shown by arrows 208 in FIG. 22. The knobs 206 may further be provided with apertures 209 22. The knobs 206 may further be provided with apertures 209 therein so that a key-like tool may be used to rotate the leveling member in a hands-free manner.

Figure 21A:
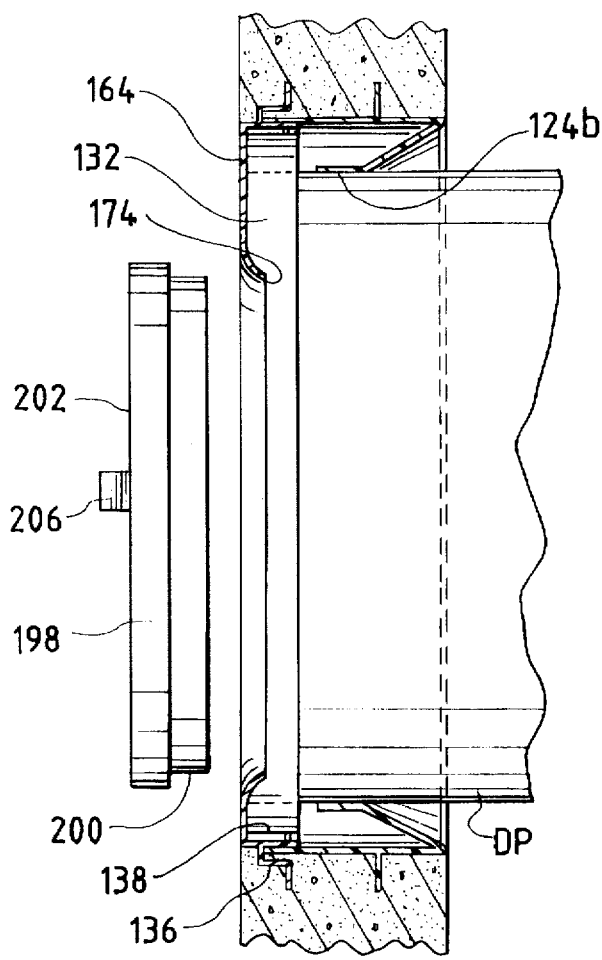
FIG. 21a is a cross-sectional view showing the two-piece seal component cast in concrete with a pipe inserted therein and a leveling device positioned adjacent to an aperture in the backplate after having been removed from the aperture in the backplate.

Although the sealing membrane is made of an elastomeric material, the sealing wall has sufficient plasticity to provide some degree of shape retaining memory. Thus, referring to FIG. 21a, upon removal of the leveling device 198 from the corresponding aperture in the sealing wall, the sealing membrane retains its wiper blade-shaped deformation. This feature facilitates re-insertion of the leveling member and a sufficiently tight seal can be repeatably achieved. It is recognized that the sealing membrane may alternatively be premolded with a wiper blade-shaped portion for sealing leveling members, pipes, and the like, but this would complicate manufacturing of the seal component.

Referring to FIG. 22, a plurality of seal components 120 having backplates 132 are cast into the concrete wall W of a septic tank. Pipes DP are inserted into the wiper blades 124 of seal components 120 as illustrated in FIG. 21. As shown in FIG. 22, the concrete wall W of the box is slightly out of level with a water level line L contained therein. Leveling devices 198 are rotated by turning them with knobs 206. To align the openings 204 with the water level, the openings 204 are all positioned at the lowest position, and the box is then filed with water so that water runs out the lowest holes which are then adjusted so that the water runs out of the holes equally and the openings 204 are leveled with the water level L. In such a construction, when the water level rises, a generally equal amount of water will flow through the openings 204 and into the drainage pipes DP. If such leveling devices are not provided and the septic tank is out of level, the lower sealing component 120 would receive more flow than a higher sealing component which would result in an unequal distribution of fluid out into the distribution field. Advantageously, leveling device 198 is attached to the unitary-sized opening, such as of about 3.150 inches, defined by preformed sealing wall 188. That is, it is not connected to but is, in fact, remotely spaced away from drainage pipe DP. Universal leveling devices 198 and seal component 120 may therefore be used to act as a flow control system regardless of variances in the pipe used.

Figure 24:
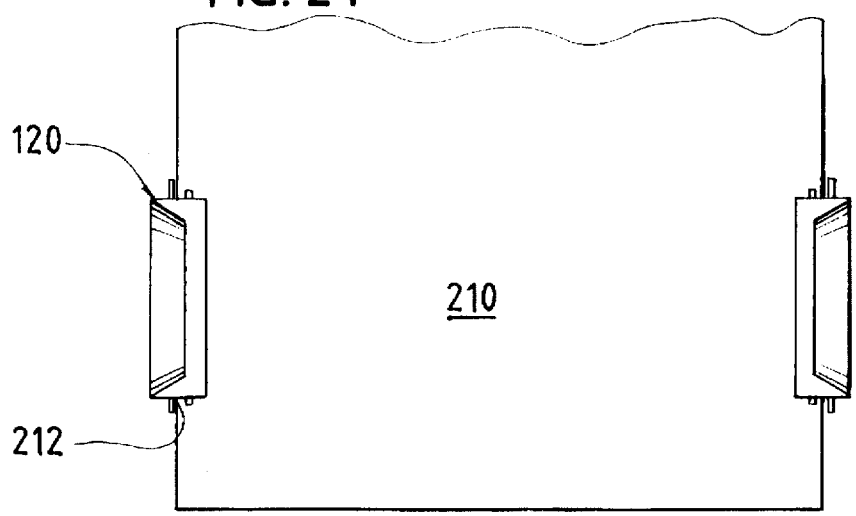
FIG. 24 is a cross-sectional, somewhat schematic, view showing the two-piece seal component placed in an aperture in a plastic distribution box.
Figure 25:
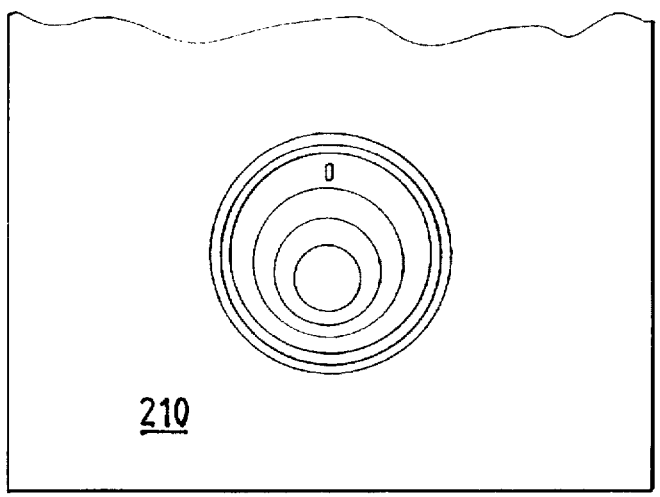
FIG. 25 is an inside elevational, somewhat schematic, view of the inventive component placed in the wall of a plastic distribution box.
Figure 26:
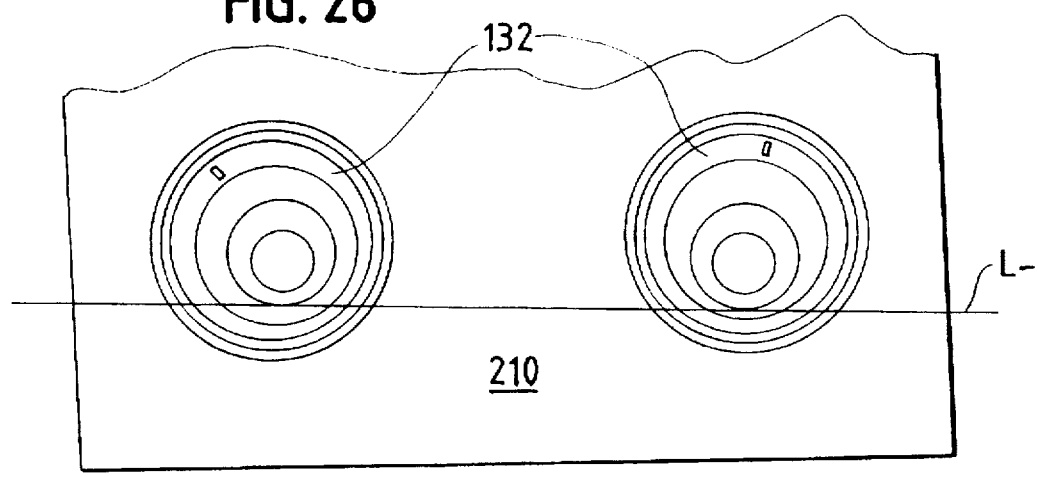
FIG. 26 is a side elevational, somewhat schematic, view of the interior wall of a plastic distribution box which includes two of the inventive seal components.

Another advantageous aspect of this invention lies in the fact that seal component 120 is a universal seal and that it can be used with a poured concrete septic tank wall W as previously described or can be used in a plastic distribution or drop box 210 as shown in FIGS. 24-26. In those figures, the seal components 120 are disposed in circular apertures 212 of distribution box 210. The distribution box 210 may take the form of the box components described in co-owned U.S. Pat. No. 4,663,036, which is hereby incorporated by reference. To install the sealing components, the cylindrical wall member 122 is first inserted through the aperture 212 and the backplate 132 is then connected to the cylindrical wall member as previously described. The entire sealing membrane 164 or removable portions 172 or 180 may then be removed for accommodating a selected size drainage pipe as also previously described.

Figure 24A:
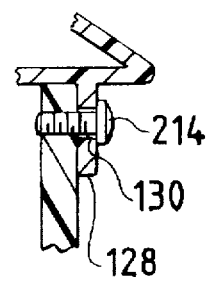
FIG. 24a is an enlarged view of the cylindrical wall member of the two-piece seal end and the box wall.

Referring to FIG. 24a, seal component 120 may advantageously be attached to box 210 by inserting securement means generally designated at 214 through apertures 130 in locking flange 128. In the illustration, the securement means 214 is shown as a conventional screw but other suitable connecting means, such as rivets and plastic plugs, may also be used. In the alternative, the cylindrical wall 122 may include an annular protrusion or bump (not shown) so that the box wall 210 is received between annular flange 128 and the annular protrusion to snap fit the seal into the box wall 210.

While the cylindrical wall member 122 is securely affixed to box component 210, the backplate 132 is not and rather is rotatable about the cylindrical wall member 132. In particular, when the seal component 120 is installed in box component 210, there is nothing to restrain backplate 132 from rotating so that U-shaped groove 134 slides radially along the back end 122b of cylindrical wall member 122. Such movement is advantageous in that the backplate 132 can then be used as a leveling device.

In particular, a plurality of seal components 120 may be disposed in a wall of a plastic box 210 as shown in FIG. 26. In FIG. 26, the wall of a box component 210 is slightly out of level with water level L. Removable portions 180 are then removed from backplates 132, and the backplates 132 are rotated so that the openings 180 are aligned with the water level L. By adjusting the openings 180 so that they are level, regardless of the orientation of box 210, the backplates will ensure that an equal amount of flow goes through the backplates 132 and into respective drainage pipes which are attached to the wiper blades 124 at the opposite ends of the seal components 120.

Referring to FIG. 27, in which a leveling device is shown fully inserted to the sealing membrane, as pipe DP (shown in phantom lines) is inserted into the wiper blade 124, the wiper deforms about the pipe forming a tight seal. Once the pipe DP fully inserted, such that it firmly abuts the inner surface of the sealing membrane 164, fluid passing through the pipe is prevented from reaching the seal between the wiper blade 124 and the outer surface of the pipe.

The inventive seal component 120 has many advantages over all of the prior art constructions. First, seal component 120 is universal in that it can be used in either a poured concrete septic tank or a plastic distribution box. The backplate 132 may also be advantageously molded to include separately removable portions to accommodate different sized pipes. When so molded, the unremoved portions of the backplate 132 expand and deform to create a wiper blade-type seal around a pipe or leveling member inserted into the backplate. In addition, the backplate 132 prevents concrete from entering behind the wiper blade 124 when seal component 120 is cast in a concrete wall. The backplate 132 is also compatible with a leveling device 198 for controlling the flow out of the component. Advantageously, the leveling device 198 is directly attached to the backplate 132 and an effective seal is formed therebetween regardless of the size of pipe inserted in wiper blade 124 or any irregularities that pipe may have. In addition, when the seal component 120 is used in a plastic distribution box, the backplate 132 itself can be used as a leveling device for controlling flow out of the distribution box.

From the foregoing, it is believed that those skilled in the art will readily appreciate the unique features and advantages of the present invention over previous types of pipe seal apparatus for poured concrete tank walls and plastic fluid distribution box walls. Further, it is to be understood that while the present invention has been described in relation to a particular preferred embodiment as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

I claim:

1. A seal component for use in poured concrete or plastic tank or box components of a fluid distribution system, said seal component comprising:

a cylindrical wall member having inner and outer surfaces and front and back ends;

a radially-extending anchor flange disposed on said outer surface of said cylindrical wall member;

an angled wiper blade having a first end connected to said front end of said cylindrical wall member and having a second free end, said second free end of said wiper blade having a smaller diameter than a diameter of said first end;

a generally circular backplate which extends across and seals the back end of said cylindrical wall member; and connecting means for removably connecting said backplate to the back end of said cylindrical wall member, wherein said connecting means comprises a generally U-shaped annular groove disposed on said backplate and being defined by an inner first cylindrical portion, an outer second cylindrical portion spaced apart from said first cylindrical portion, and a radially-extending intermediate portion, said U-shaped groove being in shape to receive an annular edge of said back end of said cylindrical wall member.

2. The invention of claim 1 in which said connecting means further includes a locking means for permanently locking said cylindrical wall member to said backplate and said locking means comprises a radially-extending locking flange which is provided on said backplate and projects radially beyond the outer surface of the cylindrical wall member, whereby, when said component is cast in a concrete wall of a drainage system component, the concrete engages said locking flange and said anchor flange which secures said cylindrical wall member to said backplate.

3. The invention of claim 2 in which said locking flange includes means for indicating a top of said component.

4. The invention of claim 3 in which said indicating means comprises a notch.

5. The invention of claim 1 in which said backplate includes a sealing membrane.

6. The invention of claim 5 in which said inner cylindrical portion of said U-shaped groove is a greater axial length than an axial length of said outer cylindrical portion of said U-shaped groove, said sealing membrane being connected to a distal edge of said inner cylindrical portion and being axially spaced outward beyond said intermediate portion of said U-shaped groove.

7. The invention of claim 5 in which said first end of said wiper blade is connected to said front end of said cylindrical wall member by a living hinge, whereby said wiper blade is pivotable between a first position in which said free end of the wiper blade projects inwardly towards said sealing membrane and a second position in which said free end of the wiper blade projects outwardly away from said sealing membrane.

8. The invention of claim 5 in which said backplate is radially rotatable with respect to said cylindrical wall member and said sealing membrane includes at least one generally circular removable portion.

9. The invention of claim 5 in which said connecting means further includes a locking means for releasably locking said annular edge of said back end of said cylindrical wall member in said U-shaped groove.

10. The invention of claim 9 in which said locking means includes a first radially-extending annular rib disposed on an inner surface of said U-shaped groove and a second radially-extending annular rib disposed on said back end of said cylindrical wall member, whereby said first and second annular ribs interlock to releasably secure the backplate to the cylindrical wall member when the annular edge of said back end of the cylindrical wall member is inserted into said U-shaped groove.

11. The invention of claim 9 in which said locking means comprises diametrically opposed recesses respectively provided on the outer surface of said first cylindrical portion of said U-shaped groove and the inner surface of said second cylindrical portion of said U-shaped groove and diametrically opposed radially-extending ribs provided on said back end of said cylindrical wall member, whereby said ribs are received in said recesses when said back end of said cylindrical wall member is inserted into said U-shaped groove.

12. The invention of claim 9 in which said locking means comprises a first pair of radially-extending ribs provided on an outer surface of said first cylindrical portion of said U-shaped groove, a second pair of radially-extending ribs disposed on an inner surface of said second cylindrical portion of said U-shaped groove, and a pair of radially-extending diametrically opposed ribs provided on the back end of said cylindrical wall member, whereby said diametrically-opposed ribs on said back end can be releasably locked in a middle portion between said first and second pairs of ribs which are disposed on said U-shaped groove when said back end of said cylindrical wall member is inserted into said U-shaped groove.

13. The invention of claim 9 in which said locking means comprises a plurality of elongate members radially spaced from one another and disposed on an inner surface of said second cylindrical portion and approaching said first cylindrical portion, whereby said annular edge of said back end of said cylindrical wall member is releasably secured between said elongate members and said first cylindrical portion.

14. The invention of claim 5 in which said sealing membrane includes a first annular score line and a pull tab which is adjacent to said first annular score line.

15. The invention of claim 14 in which said first annular score line is connected to a configured score line having a V-shaped section, said pull tab being disposed within said V-shaped section.

16. The invention of claim 14 in which said sealing membrane includes a first removable portion having a second annular score line with a diameter less than a diameter of said first annular score line.

17. The invention of claim 16 in which said sealing membrane includes a second removable portion having a third annular score line with a diameter smaller than the diameter of said second annular score line.

18. The invention of claim 16 in which said sealing membrane is made of a stretchable elastomeric material so that when said first removable portion is removed from said sealing membrane and a pipe having an outer diameter greater than the diameter of said second annular score line is inserted through the sealing member, the remaining unremoved portion of the sealing membrane deforms and stretches to form a tight seal about said pipe.

19. The invention of claim 18, wherein when said second removable portion is removed from said sealing membrane and a pipe having an outer diameter greater than the diameter of said third annular score line is inserted through the sealing member, the remaining unremoved portion of the sealing membrane deforms and stretches to form a tight seal about said pipe.

20. The invention of claim 16 in which said first removable portion is removed from said seal component and a leveling device is received by said sealing membrane, said leveling device comprising a smooth cylindrical member which rotatably is received in said sealing membrane and a generally circular faceplate which includes an eccentric opening.

21. The invention of claim 20 in which said faceplate further includes at least first and second axially-extending projections for facilitating rotation of said leveling device within said sealing membrane.

22. In a poured concrete box product of an on-site waste water disposal system having a plurality of side walls, a plurality of seal components cast into said side walls, and a plurality of discharge pipes connected to at least some of said plurality of seal components for fluid communication with an interior of the poured concrete box, wherein the improvement comprises:

each of at least two of said seal components comprising a cylindrical wall member, an angled wiper blade having a first end connected to a front end of said cylindrical wall member and a second free end which receives one of said plurality of pipes, and a generally circular backplate which extends across a back end of the cylindrical wall member, said backplate including connecting means for removably connecting said backplate to said back end of the cylindrical wall member, said connecting means comprising a generally U-shaped annular groove disposed on said backplate and having inner and outer spaced-apart cylindrical portions and a radially-extending intermediate portion, said U-shaped groove being shaped to receive an annular edge of said back end of said cylindrical wall member, and said backplate further including a sealing membrane which defines an opening and includes sealing means which extend about a periphery of said opening; and a leveling device disposed within said opening and including a smooth cylindrical wall received within said sealing means, a radial faceplate, and an eccentric opening disposed on said faceplate, said leveling device being rotatable within said sealing means of said backplate to adjust a height of said eccentric opening.

23. The invention of claim 22 in which said sealing means comprises said sealing membrane being formed of a flexible, stretchable material so that said sealing membrane stretches and forms a tight seal around said leveling device.

24. The invention of claim 22 in which said faceplate includes at least first and second axially-extending projections for facilitating rotation of said leveling device within said sealing membrane.

25. The invention of claim 22 in which said first end of said wiper blade is connected to said front end of said cylindrical wall member by a living hinge, whereby said wiper blade is pivotable between a first position in which said free end of the wiper blade projects inwardly towards said sealing membrane and a second position in which said free end of the wiper blade projects outwardly away from said sealing membrane.

26. The invention of claim 22 in which said connecting means further includes a locking means for permanently locking said cylindrical wall member to said backplate and said locking means comprises a radially-extending locking flange which is provided on said backplate and projects radially beyond the outer surface of the cylindrical wall member whereby, when said component is cast in a concrete wall of a drainage system component, the concrete engages said locking flange and said anchor flange which secures said cylindrical wall member to said backplate.

27. The invention of claim 26 in which said locking flange includes means for indicating a top of said component.

28. The invention of claim 27 in which said indicating means comprises a triangular-shaped notch.

29. The invention of claim 22 in which said connecting means further includes a locking means for releasably locking said back end of said cylindrical wall member in said U-shaped groove.

30. The invention of claim 29 in which said locking means includes a first radially-extending annular rib disposed on an inner surface of said U-shaped groove and a second radially-extending annular rib disposed on said back end of said cylindrical wall member, whereby said first and second annular fibs interlock to releasably secure the backplate to the cylindrical wall member when the back end of the cylindrical wall member is inserted into said U-shaped groove.

31. The invention of claim 29 in which said locking means comprises diametrically opposed recesses respectively provided on the outer surface of said first cylindrical portion of said U-shaped groove and the inner surface of said second cylindrical portion of said U-shaped groove and diametrically opposed radially-extending ribs provided on said back end of said cylindrical wall member, whereby said ribs are received in said recesses when said back end of said cylindrical wall member is inserted into said U-shaped groove.

32. The invention of claim 29 in which said locking means comprises a first pair of radially-extending ribs provided on an outer surface of said first cylindrical portion of said U-shaped groove, a second pair of radially-extending ribs disposed on an inner surface of said second cylindrical portion of said U-shaped groove, and a pair of radially-extending diametrically opposed ribs provided on the back end of said cylindrical wall member, whereby said diametrically-opposed ribs on said back end can be releasably locked in a middle portion between said first and second pairs of ribs which are disposed on said U-shaped groove when said back end of said cylindrical wall member is inserted into said U-shaped groove.

33. The invention of claim 29 in which said locking means comprises a plurality of elongate members radially spaced from one another and disposed on an inner surface of said second cylindrical portion and approaching said first cylindrical portion, whereby said annular edge of said back end of said cylindrical wall member is releasably secured between said elongate members and said first cylindrical portion.

34. In a plastic box product of an on-site waste water disposal system having a plurality of side walls, a plurality of seal components disposed in apertures in said side walls, and a plurality of discharge pipes connected to at least some of said plurality of seal components for fluid communication with an interior of said box, wherein the improvement comprises:

each of at least two of said seal components comprising a cylindrical wall member, an angled wiper blade having a first end connected to a front end of said cylindrical wall member and a second free end which receives one of said plurality of pipes, and a generally circular backplate which extends across a back end of the cylindrical wall member, said backplate including connecting means for removably connecting said backplate to said back end of said cylindrical wall member, said connecting means comprising a generally U-shaped annular groove disposed on said backplate and having inner and outer spaced-apart cylindrical portions and a radially-extending intermediate portion, said U-shaped groove being shaped to receive an annular edge of said back end of said cylindrical wall member, said backplate further including a sealing membrane which defines an eccentric opening and being rotatable on said cylindrical wall member to adjust a height of said eccentric opening.

35. The invention of claim 34 in which said first end of said wiper blade is connected to said front end of said cylindrical wall member by a living hinge, whereby said wiper blade is pivotable between a first position in which said free end of the wiper blade projects inwardly towards said sealing membrane and a second position in which said free end of the wiper blade projects outwardly away from said sealing membrane.

36. The invention of claim 34 in which a radially-extending anchor flange is disposed on an outer surface of said cylindrical wall member, said anchor flange including a plurality of radially spaced apertures, and securement means for insertion through said apertures of said anchor flange and for securing said cylindrical wall member to said box component.

37. The invention of claim 36 in which said securement means includes one of screws and rivets.

38. The invention of claim 34 in which said connecting means further includes a locking means for releasably locking said back end of said cylindrical wall member in said U-shaped groove.

39. The invention of claim 38 in which said locking means includes a first radially-extending annular rib disposed on an inner surface of said U-shaped groove and a second radially-extending annular rib disposed on said back end of said cylindrical wall member, whereby said first and second annular ribs interlock to releasably secure the backplate to the cylindrical wall member when the back end of the cylindrical wall member is inserted into said U-shaped groove.

40. The invention of claim 38 in which said locking means comprises diametrically opposed recesses respectively provided on the outer surface of said first cylindrical portion of said U-shaped groove and the inner surface of said second cylindrical portion of said U-shaped groove and diametrically opposed radially-extending ribs provided on said back end of said cylindrical wall member, whereby said ribs are received in said recesses when said back end of said cylindrical wall member is inserted into said U-shaped groove.

41. The invention of claim 38 in which said locking means comprises a first pair of radially-extending ribs provided on an outer surface of said first cylindrical portion of said U-shaped groove, a second pair of radially-extending ribs disposed on an inner surface of said second cylindrical portion of said U-shaped groove, and a pair of radially-extending diametrically opposed ribs provided on the back end of said cylindrical wall member, whereby said diametrically-opposed ribs on said back end can be releasably locked in a middle portion between said first and second pairs of ribs which are disposed on said U-shaped groove when said back end of said cylindrical wall member is inserted into said U-shaped groove.

42. The invention of claim 38 in which said locking means comprises a plurality of elongate members radially spaced from one another and disposed on an inner surface of said second cylindrical portion and approaching said first cylindrical portion, whereby said annular edge of said back end of said cylindrical wall member is releasably secured between said elongate members and said first cylindrical portion.

* * * * *

UNITED STATES PATENT AND TRADEMARK OFFICE
CERTIFICATE OF CORRECTION

PATENT NO. : 5,711,536
DATED      : January 27, 1998
INVENTOR(S) : Theodore W. Meyers It is certified that error appears in the above-indentified patent and that said Letters Patent is hereby corrected as shown below:

Claim 30, column 19, line 6, "fibs" should be --ribs--.

Signed and Sealed this

Fifth Day of May, 1998

Attest:

BRUCE LEHMAN

*Attesting Officer*     *Commissioner of Patents and Trademarks*